(12) United States Patent
Machida et al.

(10) Patent No.: US 7,226,635 B2
(45) Date of Patent: Jun. 5, 2007

(54) SEALING MATERIAL COATING METHOD FOR FUEL CELL-USE SEPARATOR

(75) Inventors: Akiyoshi Machida, Sayama (JP); Tetsuo Ishii, Sayama (JP); Eiichiro Uematsu, Sayama (JP); Akihiro Ohsugi, Sayama (JP); Osamu Kakutani, Sayama (JP); Youichi Kamiyama, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 718 days.

(21) Appl. No.: 10/482,467

(22) PCT Filed: Jul. 2, 2002

(86) PCT No.: PCT/JP02/06694

§ 371 (c)(1),
(2), (4) Date: Dec. 31, 2003

(87) PCT Pub. No.: WO03/005469

PCT Pub. Date: Jan. 16, 2003

(65) Prior Publication Data

US 2004/0191409 A1     Sep. 30, 2004

(30) Foreign Application Priority Data

Jul. 6, 2001 (JP) ............... 2001-206639
Jul. 6, 2001 (JP) ............... 2001-206742
Jul. 11, 2001 (JP) ............... 2001-211333

(51) Int. Cl.
  *B05D 5/12* (2006.01)
  *B05D 3/12* (2006.01)
  *B05D 5/00* (2006.01)

(52) U.S. Cl. .............. 427/115; 427/8; 427/287; 427/356

(58) Field of Classification Search .................. 427/8, 427/115, 287, 356; 429/35, 36, 38, 39
See application file for complete search history.

(56) References Cited

U.S. PATENT DOCUMENTS

| 6,699,613 | B2* | 3/2004 | Inoue et al. .......... 429/35 |
| 6,777,127 | B2* | 8/2004 | Einhart et al. ........ 429/35 |
| 2004/0137305 | A1* | 7/2004 | Inoue et al. .......... 429/36 |
| 2005/0095492 | A1* | 5/2005 | Frank et al. .......... 429/35 |

FOREIGN PATENT DOCUMENTS

| JP | 61-216250 A | 9/1986 |
| JP | 63-43264 A | 2/1988 |
| JP | HEI-3-110450 | 9/1993 |
| JP | 2000-123848 | 4/2000 |
| JP | 2001-196078 | 7/2001 |

* cited by examiner

Primary Examiner—Brian K. Talbot
(74) Attorney, Agent, or Firm—Rankin, Hill, Porter & Clark LLP

(57) ABSTRACT

A method for coating a sealant (39) on a separator (40) for a fuel cell. The separator has a sealing groove (118) formed therein, and widths of the sealing groove at a coating-start portion (39*a*) and a coating-end portion (39*b*) of the sealant are made greater than widths of remaining portions of the sealing groove. The sealant coating-start portion and the coating-end portion are made to intersect at a place where the width of the sealing groove is large. Adhesion between the coating-start portion and the coating-end portion is improved, and also, degrees of freedom of a sealant coated position increase, and sealability of a cell for a fuel cell is improved.

12 Claims, 24 Drawing Sheets

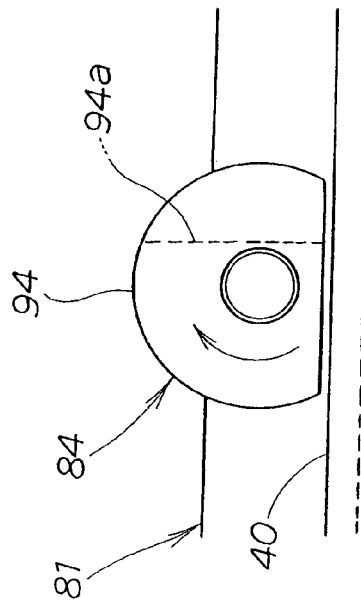
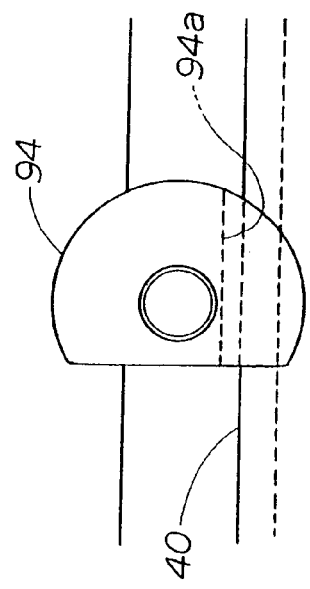
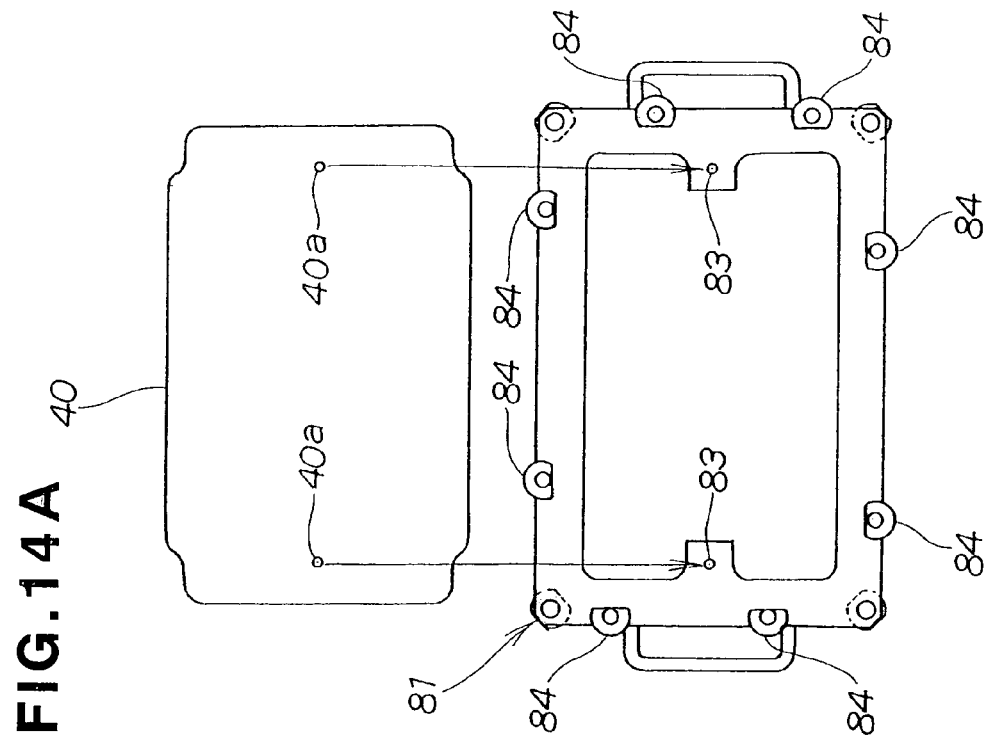

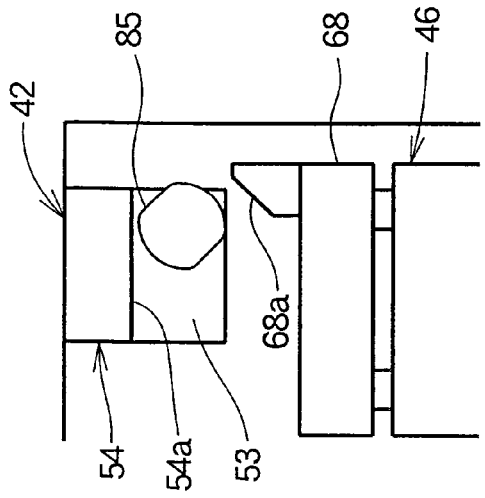
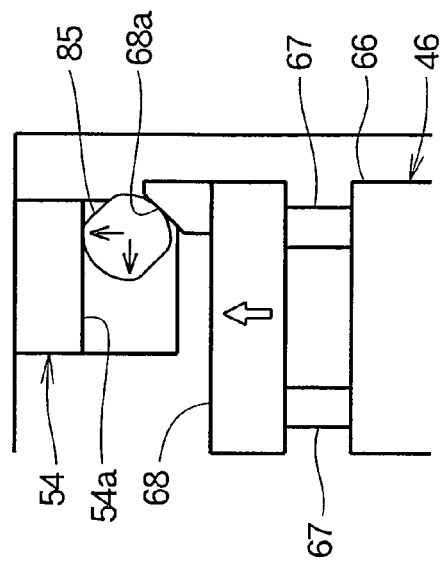
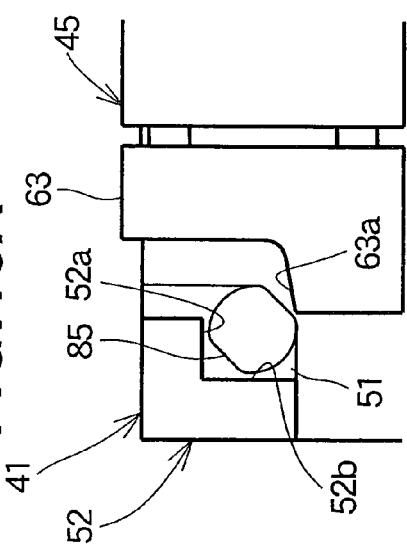
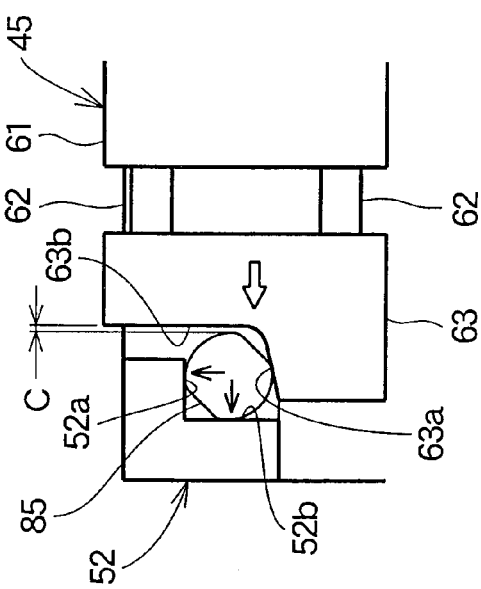

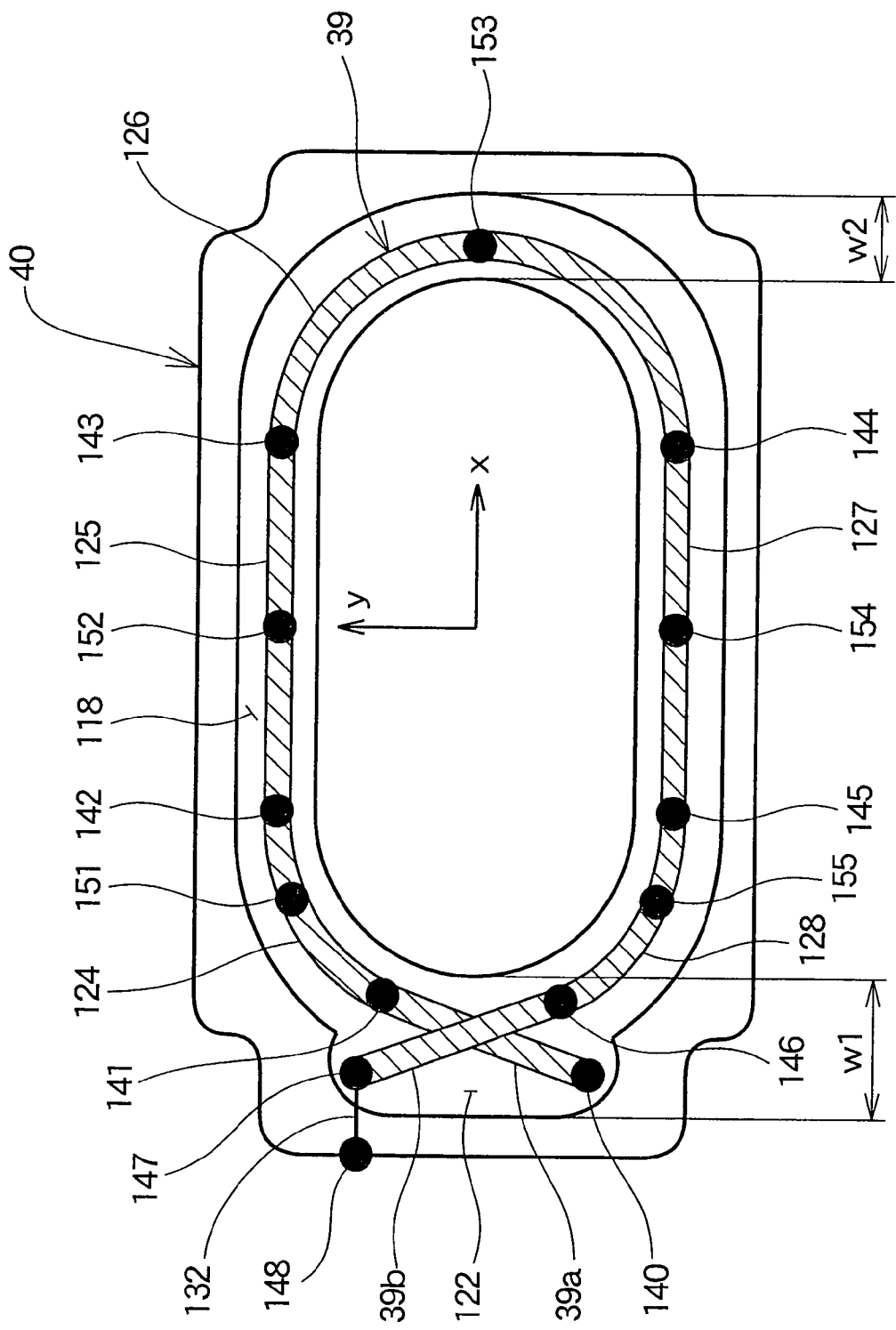

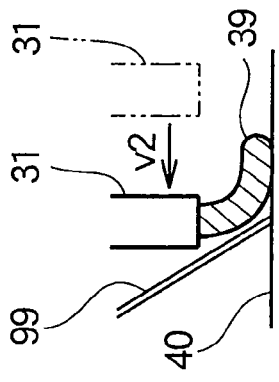
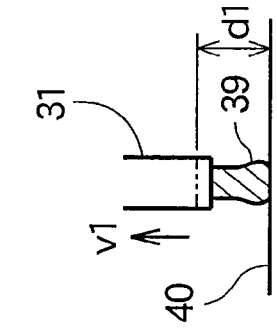
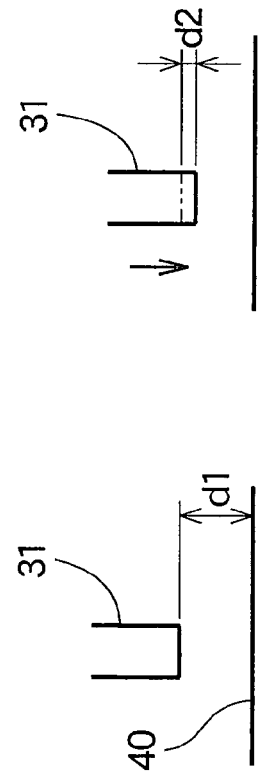
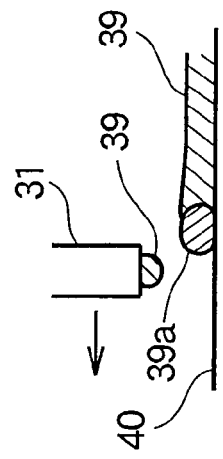
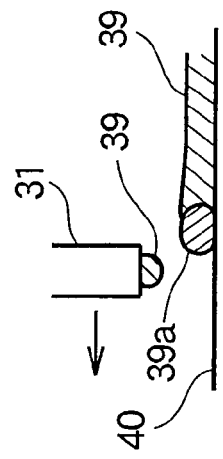
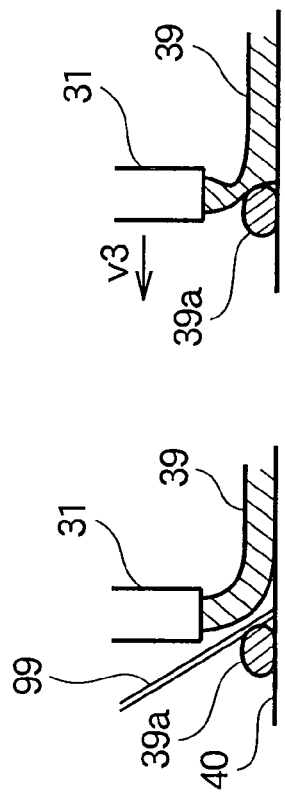

SEALING MATERIAL COATING METHOD FOR FUEL CELL-USE SEPARATOR

TECHNICAL FIELD

The present invention relates to a method for coating a sealant material on a fuel cell separator in which a sealant material is coated in uniform thickness to improve sealant coating quality and hence sealability for thereby improving the performance of a fuel cell.

BACKGROUND ART

A fuel cell is arranged to produce electricity through a process for obtaining water by causing hydrogen and oxygen to react utilizing a principle opposite the water electrolysis. Generally, fuel gas is replaced by hydrogen, and air or an oxidant gas is replaced by oxygen.

Such fuel cell is known from, for example, Japanese Patent Laid-Open Publication No. 2000-123848 entitled "Fuel Cell". The known fuel cell has a cell as shown in exploded perspective in FIG. 24 hereof As shown in FIG. 24, an anode side electrode 202 and a cathode side electrode 203 are mated with an electrolytic film 201. A unit fuel cell (cell module) 200 is provided by sandwiching the afore-mentioned by a first separator 206 and a second separator 207 via gaskets 204, 205.

More specifically, the first separator 206 has on a surface 206a thereof a first flow path 208 for allowing passage of a fuel gas while the second separator 207 has on a surface 207a thereof a second flow path 209 for allowing passage of an oxidant gas, so that the fuel gas and the oxidant gas are guided to the electrolytic film 201.

Because the electrical output produced by one cell module as shown in FIG. 24 is extremely small, by laminating a large number of such cell modules 200, the desired electrical output is obtained. Accordingly, the first and second separators 206, 207 are provided to prevent the fuel gas and the oxidant gas from leaking to adjacent cells. They are called "separators" in this sense.

The first separator 206 has on its surface 206a the flow path 208 for fuel gas, while the second separator 207 has on its surface 207a the flow path 209 for oxidant gas. However, it is necessary for gas to effectively contact the anode side electrode 202 and the cathode side electrode 203. Therefore, it is necessary for the flow paths 208, 209 to provide a large number of extremely shallow grooves.

Further, each of the first and second separators 206, 207 have a fuel gas supplying hole portion 210a and an oxidant gas supplying hole portion 211a at one end portion thereof, and also each have a fuel gas discharging hole portion 210b and an oxidant gas discharging hole portion 211b at the other end portion thereof. Further, each of the first and second separators 206, 207 have a cooling water supplying hole portion 212a for making cooling water pass through at one end portion thereof, and have a cooling water discharging hole portion 212b at the other end portion thereof.

The present inventors have variously tried to manufacture a cell module by sandwiching a membrane electrode assembly formed from electrolytic films and electrodes by two separators, by coating a liquid sealant in place of the gaskets 204, 205 on the separator. However, the problems shown in FIGS. 25A through 25D arose.

FIGS. 25A through 25D are operational views illustrating a method for coating a sealant on the separator for fuel cell. More concretely, FIG. 25A is an operational view showing a state before a coating-start and a coating-end of the sealant are connected; FIG. 25B is an operational view showing a state in which the coating-start and the coating-end of the sealant are connected; FIG. 25C is an operational view showing a state before the coating-start and the coating-end of the sealant are overlapped; and FIG. 25D is an operational view showing a state in which coating-start and coating-end of the sealant are overlapped.

As shown in FIG. 25A, when a sealant 223 is coated on a separator 221 by a sealant coating gun 222, if an attempt is made to connect the coating-end portion to the coating-start portion 224 of the sealant 223, as shown in FIG. 25B, a space 226 comes into being between the coating-start portion 224 and the coating-end portion 225.

Further, as shown in FIG. 25C, if an attempt is made to overlap on coating-start portion 227 of the sealant 223, as shown in FIG. 25D, spaces 221, 232 come into being between the coating-start portion 227 and the overlapped portion 228 of the sealant 223.

Therefore, the fuel gas, the oxidant gas, and water leak from the cell interior, and sufficient performance of the fuel cell cannot be obtained.

Moreover, another problem as shown in FIG. 26 arose.

FIG. 26 is an operational view illustrating the sealant coating procedure. When the sealant 223 is coated on a separator 221 by a sealant coating gun 222, if the driving portion of the sealant coating gun 222 is stopped in order to end the coating at the coating-end portion 225 of the sealant 223, there are cases in which the sealant 223 which remains in a nozzle portion 234 of the sealant coating gun 222 drops down. This leads to deterioration of the sealant coating quality or deterioration of the sealability due to non-uniformity of the sealant thickness.

Furthermore, a problem as shown in FIGS. 27A and 27B arose.

FIGS. 27A and 27B are operational views illustrating the procedure of coating the sealant onto a warped separator. More concretely, FIG. 27A is an operational view showing a state in the midst of coating the sealant, and FIG. 27B is an operational view showing a state after coating the sealant.

FIG. 27A shows a state in which the sealant 223 is coated by the sealant coating gun 222 on the separator 221 placed on a placement platform 236.

In the separator 221, when grooves such as a gas flow path or the like are formed only on one side, or when differently shaped grooves are respectively formed on one side and the other side, there are cases in which warping arises as shown in the drawings.

If an attempt is made to coat the sealant 223 on such a warped separator 221 by the sealant coating gun 222, the distance between the distal end of the sealant coating gun 222 and the separator 221 is changed when the sealant coating gun 222 horizontally moves as shown by the outlined arrow. Therefore, as shown in FIG. 27B, for example, a sealant thickness th2 at the central portion of the separator 221 is smaller than a sealant thickness th1 at the edge of the separator 221. Therefore, there is the concern that gas and water will leak from the portion at which the sealant 223 is thin.

DISCLOSURE OF THE INVENTION

An object of the present invention is to coat a sealant to a uniform thickness on a separator for a fuel cell and to improve the sealant coating quality, and further, to improve the sealability and improve the performance of the fuel cell.

The present invention provides a method for coating a sealant on a separator for a fuel cell which coats a liquid sealant at a periphery of a gas flow path and a water flow path of a separator by using means for coating a sealant which is formed from a motor, means for extruding a sealant driven by the motor, and a nozzle portion provided at a distal end of the means for extruding a sealant, wherein a sealing groove in which the sealant is coated is provided, and widths of the sealing groove at coating-start portion and coating-end portion of the sealant are made to be greater than widths of portions other than the coating-start portion and the coating-end portion, and the coating-start portion and the coating-end portion of the sealant are made to intersect at a place where the width of the sealing groove is made large.

By making the coating-start portion and the coating-end portion of the sealant intersect, adhesion between the coating-start portion and the coating-end portion can be improved, and as compared with a case in which the distal end of the coating-start portion and the distal end of the coating-end portion are simply connected, it is possible to eliminate space between the coating-start portion and the coating-end portion, and the sealability can be improved.

Further, because the coating-start portion and the coating-end portion are made to intersect at a place where the width of a sealing groove is made large, the degrees of freedom of the coated position of the sealant can be increased, and the coated position of the sealant can be set such that space between the coating-start portion and the coating-end portion can be eliminated, and an improvement in the sealability can be further aimed for.

Preferably, at the coating-end portion of the sealant, before ending the coating, the horizontal moving velocity of the nozzle portion is made to be a low velocity and the sealant coated amount is reduced.

Due to the horizontal moving velocity of the nozzle portion being made to be a low velocity, the sealant can more easily adhere to the separator by taking time at the coating-end portion of the sealant, and when the coating-end portion is connected to the coating-start portion of the sealant, space between the coating-end portion and the coating-start portion can be eliminated, and the sealability can be improved.

Further, by reducing the sealant coated amount at the coating-end portion of the sealant, it is possible to prevent outside dimension of the coated sealant from becoming large by making a horizontal moving velocity be a low velocity.

Further, preferably, the means for coating a sealant is raising-lowering controlled so as to go along the outer periphery of the sealant at a point in time when the distal end of the means for coating a sealant has approached the coating-start portion of the sealant.

If the sealant coating gun is raising-lowering controlled so as to go along the outer periphery of the sealant at a point in time when the distal end of the means for coating a sealant has approached the coating-start portion of the sealant, the sealant can be coated so as to adhere to the outer periphery of the sealant of the coating-start portion, and space at the intersection portion between the coating-start portion and the coating-end portion of the sealant is eliminated, and it is possible to prevent gas and water from leaking from the intersection portion.

Moreover, a non-contact type sensor is additionally provided at the means for coating a sealant, and it is good to start raising-lowering control by detecting the coating-start portion of the sealant by the non-contact type sensor.

By using the non-contact type sensor, the coating-start portion of the sealant can be precisely detected, and adhesion of the sealant which is coated on the coating-start portion can be improved, and the sealability can be further improved.

It is preferable to additionally provide means for straightening, which straightens warping of the separator, at a sealant coating station which coats the sealant on the separator, and to coat the sealant on the separator while straightening warping of the separator by the means for straightening.

If the means for straightening straightens the warping of the separator and the sealant is coated on the separator while making the means for straightening work, the distance between the separator and the means for coating a sealant can be maintained constant, and the sealant can be coated to a uniform thickness.

Preferably, negative pressure generated at the means for straightening is controlled such that a clearance between the separator and the means for coating a sealant becomes a predetermined clearance.

By only controlling the negative pressure, the separator and the means for coating a sealant can be maintained to have a predetermined clearance, and preparations at the time of coating the sealant can be easily carried out, and the operation time can be shortened.

BRIEF DESCRIPTION OF THE DRAWINGS

FIG. 8A is a sectional view showing the straightening device, and FIG. 8B is a sectional view showing operation of the straightening device;

FIG. 14A through FIG. 14C are operational views showing positioning and fixing of the separator according to the present invention to the pallet, where FIG. 14A is a plan view showing positioning of the separator, and FIG. 14B is an operational view showing a state before the separator is fixed, and FIG. 14C is an operational view showing a state after the separator has been fixed;

FIG. 16A through FIG. 16D are operational views showing positioning of the pallet for the separator according to the present invention on the separator placement platform, where FIG. 16A is a plan view showing a positioning block placed on a first pallet placement portion, and FIG. 16B is a plan view showing a positioning block placed on a second pallet placement portion, and FIG. 16C is a plan view showing a positioned state of the positioning block placed on the first pallet placement portion, and FIG. 16D is a plan view showing a positioned state of the positioning block placed on the second pallet placement portion;

FIG. 17A is an operational view showing a state before straightening, and FIG. 17B is an operational view showing a state after straightening;

FIG. 19A through FIG. 19G are operational views for sequentially explaining the coating procedures, and FIG. 19H is an operational view showing the other coating procedure of a sealant intersection portion;

FIG. 20A is an operational view showing a state before laminating, and FIG. 20B is an operational view showing a state after laminating;

FIG. 21 is a plan view showing another example of a coated state of the separator and the sealant coated on the separator according to the present invention;

FIG. 22A through FIG. 22G are operational views for sequentially explaining of another example of movement of a nozzle portion of the sealant coating gun and coating operation of the sealant according to the present invention;

FIG. 25A is an operational view showing a state before a coating-start and a coating-end of the sealant are connected, and FIG. 25B is an operational view showing a state in which the coating-start and the coating-end of the sealant have been connected, and FIG. 25C is an operational view showing a state before the coating-start and the coating-end of the sealant are overlapped, and FIG. 25D is an operational view showing a state in which the coating-start and the coating-end of the sealant have been overlapped;

FIG. 27A is an operational view showing a state in the midst of coating the sealant, and FIG. 27B is an operational view showing a state after the sealant has been coated.

BEST MODE FOR CARRYING OUT THE INVENTION

Figure 1:
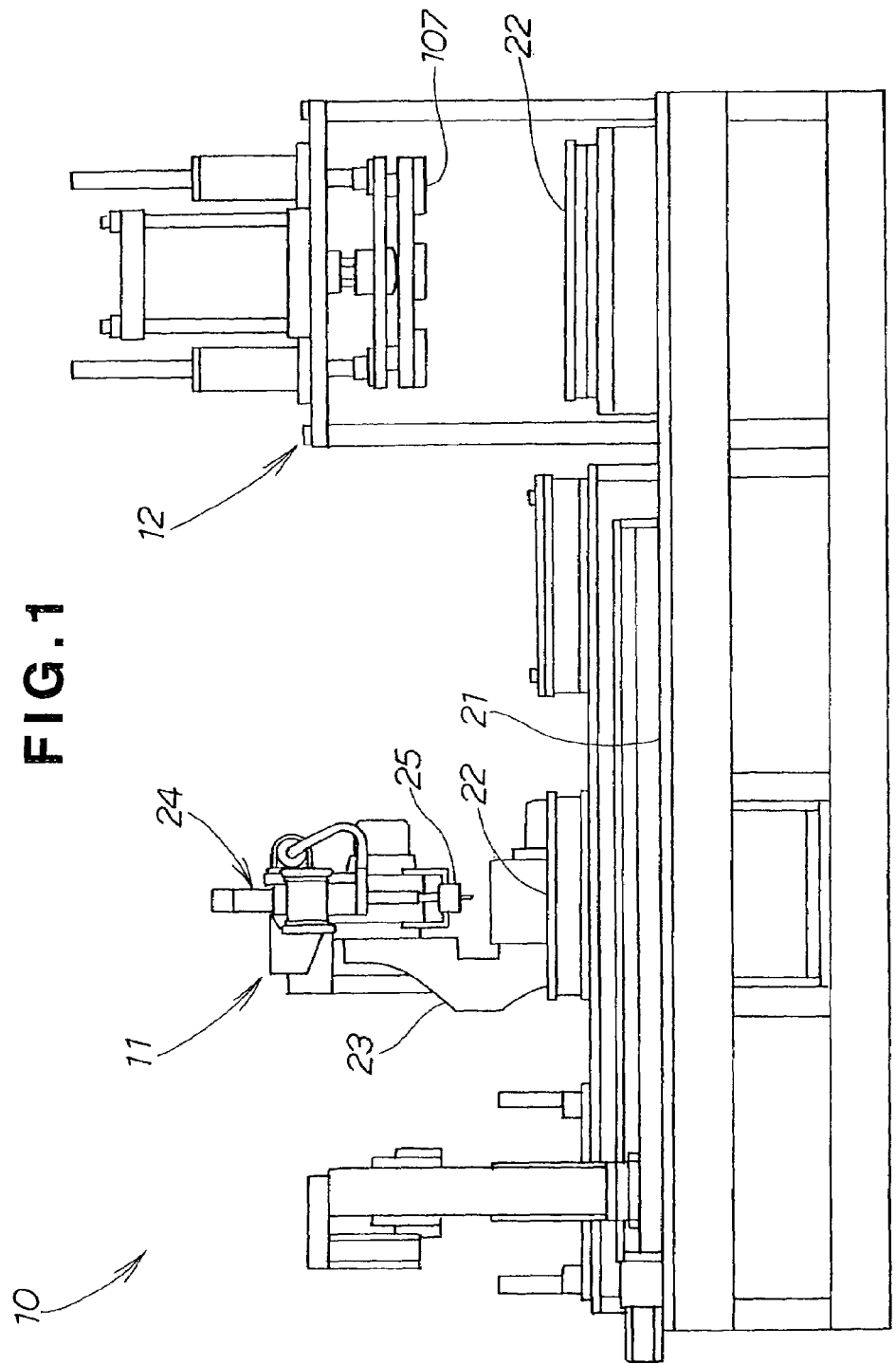
FIG. 1 is a front view of a sealant coating laminating apparatus of a separator for fuel cell according to the present invention.

As shown in FIG. 1, a seal coat laminating apparatus 10 has a sealant coating station 11 which coats a sealant material on a separator and a laminating station 12 which laminates membrane electrode assembly on the separator on which the sealant material was coated. Note that reference numeral 13 denotes an introducing station introducing the separator into the sealant coating station 11, and reference numeral 14 is a trimming station trimming the membrane electrode assembly.

The membrane electrode assembly (MEA: Membrane Electrode Assembly) is structured such that an anode side electrode and a cathode side electrode formed from carbon papers are respectively adhered to the both sides of a high polymer electrolytic film formed from a high molecular compound.

Figure 2:
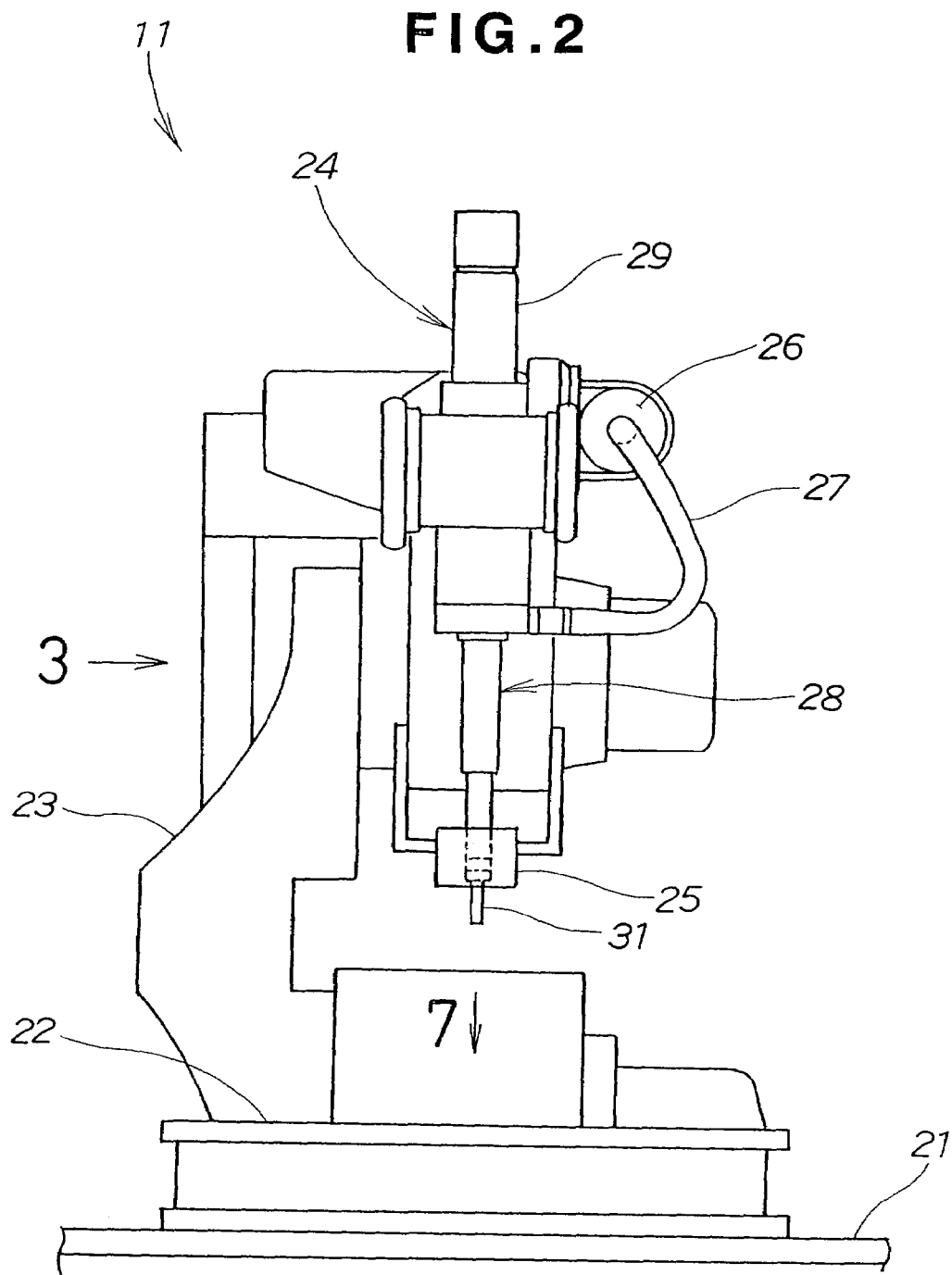
FIG. 2 is an enlarged front view of principal parts of a sealant coating station according to the present invention.

As shown in FIG. 2, the sealant coating station 11 is formed from a separator placement platform 22 attached to a base portion 21, an arm portion 23 attached the base portion 21, a sealant coating gun 24 attached the arm portion 23, and a non-contact type sensor 25 disposed so as to be near to the distal end of the sealant coating gun 24.

The sealant coating gun 24 is formed from a sealant cartridge 26 which houses a sealant material and which is exchangeable, a sealant supplying hose 27 attached the sealant cartridge 26, a sealant extruding portion 28 to which the distal end of the sealant supplying hose 27 is connected, an electric motor 29 driving the sealant extruding portion 28, and a nozzle portion 31 attached to the distal end of the sealant extruding portion 28 for discharging sealant.

The non-contact type sensor 25 is a sensor which senses, in a state of non-contact, the sealant, which was previously coated in the midst of coating the sealant on the separator by irradiating, for example, a laser onto a separator surface which is substantially below the nozzle portion 31. On the basis of a signal from the non-contact type sensor 25, a control apparatus which is not illustrated drives the arm portion 23 and controls the horizontal movement and the raising-lowering of the sealant coating gun 24.

As will be described later, the sealant extruding portion 28 of the sealant coating gun 24 is structured such that a screw at which a spiral groove is provided is inserted in a cylinder, and sucks the sealant in the sealant cartridge 26 via the sealant supplying hose 27 by rotating the screw by the electric motor 29, and extrudes the sealant between the inner wall of the cylinder and the groove of the screw, and discharges the sealant from the nozzle portion 31. Further, as will be described later, the sealant extruding portion 28 pushes the sealant up between the inner wall of the cylinder and the groove of the screw, and sucks the sealant from the nozzle portion 31, by rotating the screw in a direction opposite to the above direction.

Figure 3:
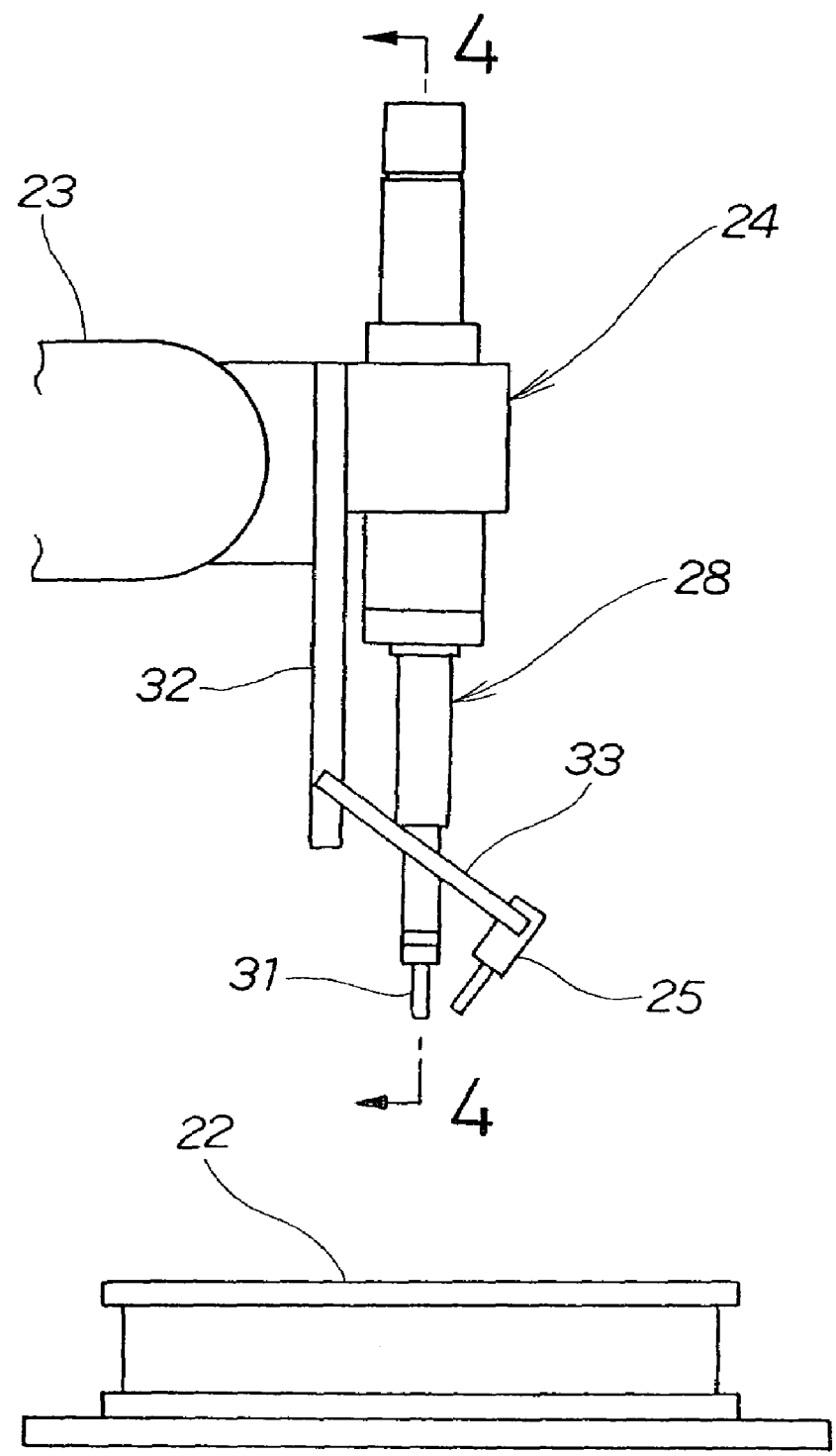
FIG. 3 is a side view of the sealant coating station as seen from arrow 3 of FIG. 2.

As shown in FIG. 3, a backing-plate 32 is attached to the rear portion of the sealant coating gun 24. Stays 33, 33 (only the one at the front side is illustrated) are extended in an oblique direction from the lower end of the backing-plate 32. The non-contact type sensor 25 is attached to the distal ends of these stays 33, 33.

The distal end of the non-contact type sensor 25 is directed downward of the nozzle portion 31.

Figure 4:
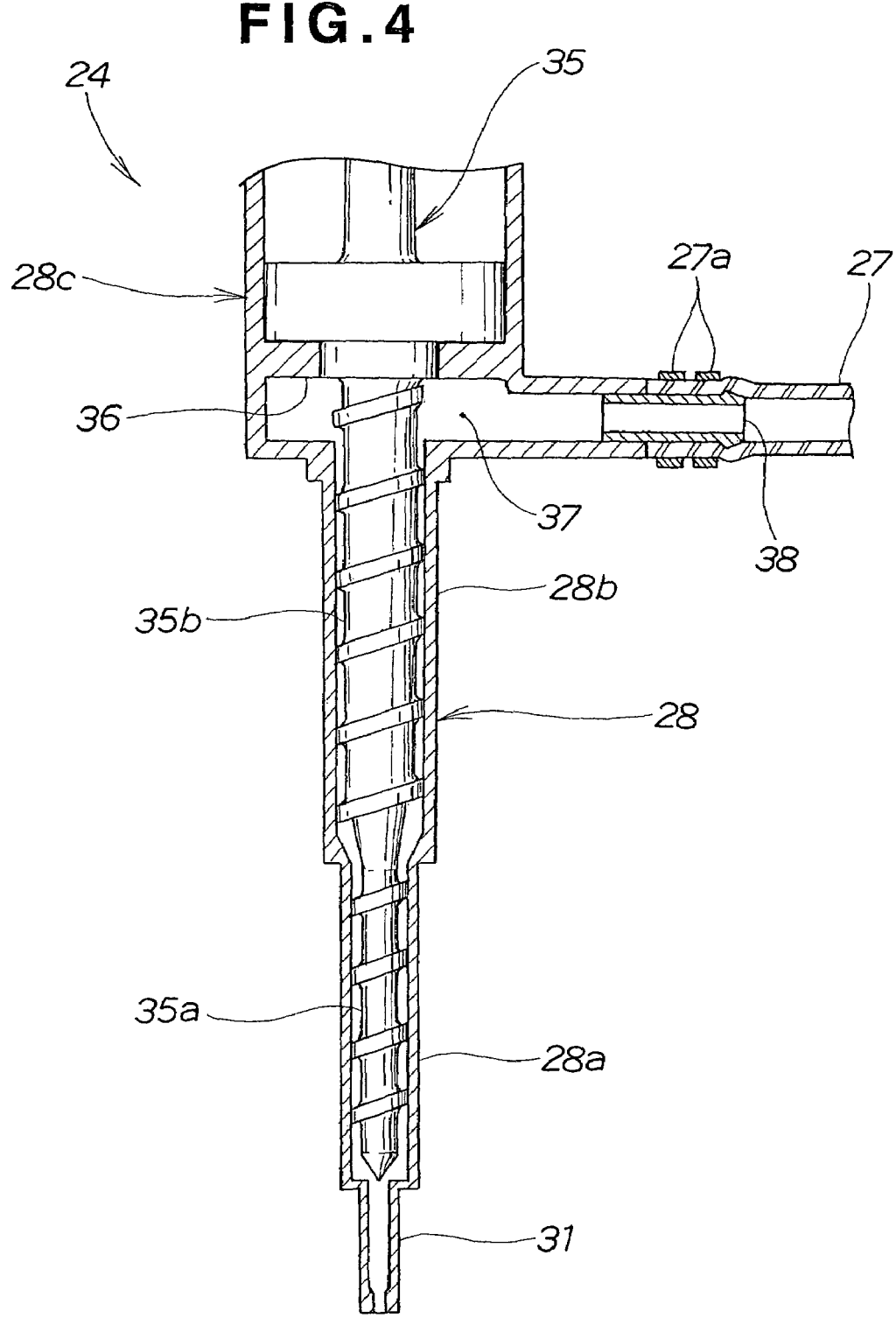
FIG. 4 is a sectional view taken along line 4—4 in FIG. 3.

In FIG. 4, a first cylinder portion 28$a$ and a second cylinder portion 28$b$ are provided at the sealant extruding portion 28 of the sealant coating gun 24. A sealant extruding shaft 35, in which a first screw 35$a$ and a second screw 35$b$ are respectively inserted in these first cylinder portion 28$a$ and second cylinder portion 28b, is connected to an output shaft of the electric motor 29 (refer to FIG. 3).

Here, reference numerals 27a, 27a denote hose bands, and reference numeral 28c denotes a case portion which is integrally formed with the second cylinder portion 28b, and reference numeral 36 denotes a bearing portion provided for supporting the sealant extruding shaft 35 at the case portion 28c, and reference numeral 37 denotes a sealant introducing room formed at the case portion 28c for communicating with the sealant supplying hose 27, and reference numeral 38 denotes a joint.

Next, the method for coating the sealant will be described.

Figure 5:
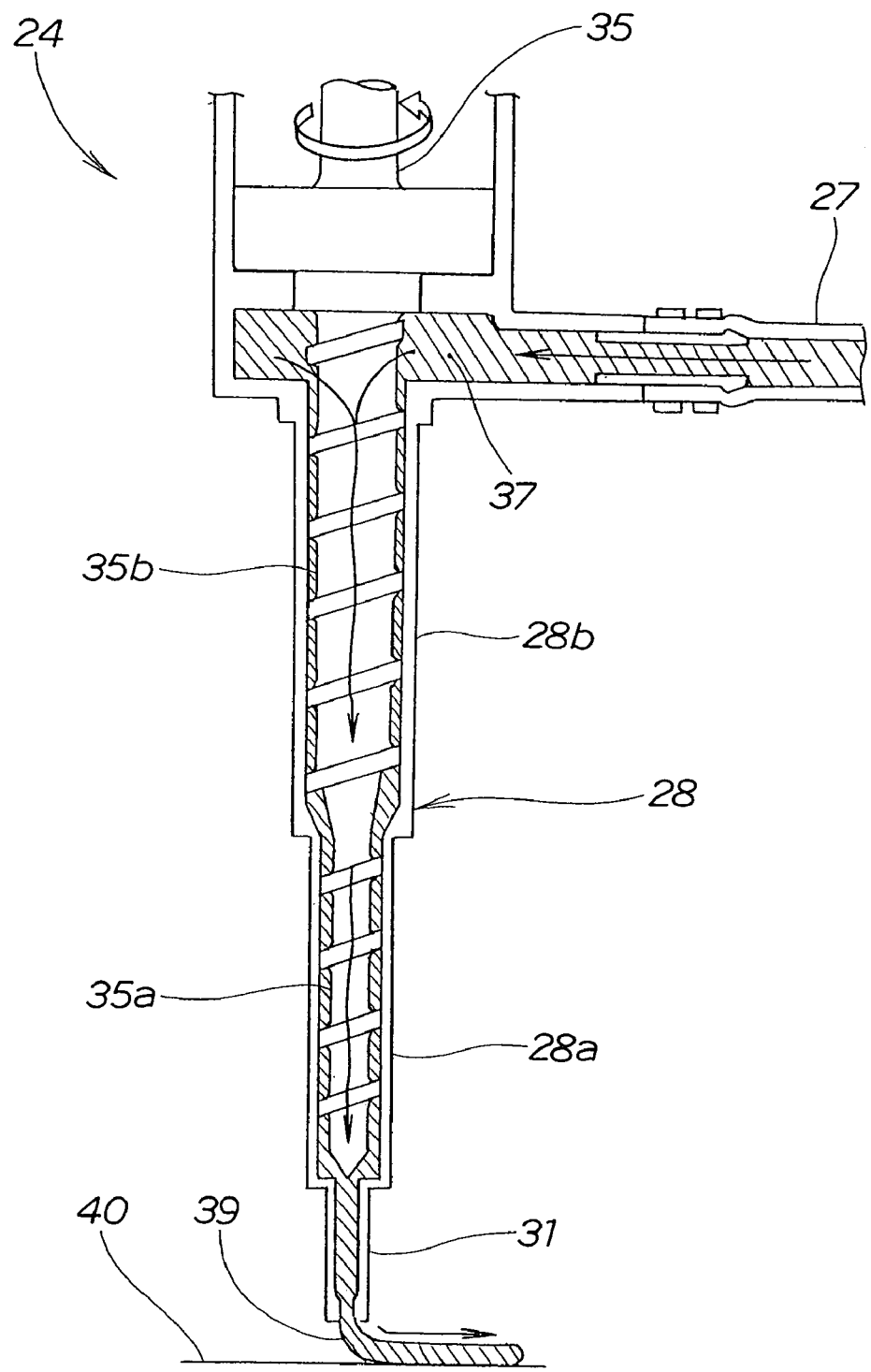
FIG. 5 is an operational view showing discharging of a sealant by a sealant coating gun according to the present invention.

As shown in FIG. 5, in order to start coating of a sealant 39, the sealant extruding shaft 35 is rotated in the direction of the outlined arrow by operating the electric motor. The rotating direction of the electric motor and the sealant extruding shaft 35 here is the forward direction (is forward rotation).

In accordance therewith, the sealant 39 sucked into the sealant introduction room 37 via the sealant supplying hose 27 from the sealant cartridge is, as shown by the arrows, extruded downward from between the first cylinder 28a and the groove of the first screw 35a, and between the second cylinder 28a and the groove of the second screw 35b, and is discharged from the nozzle portion 31 to the exterior, and is coated on the separator 40.

Figure 6:
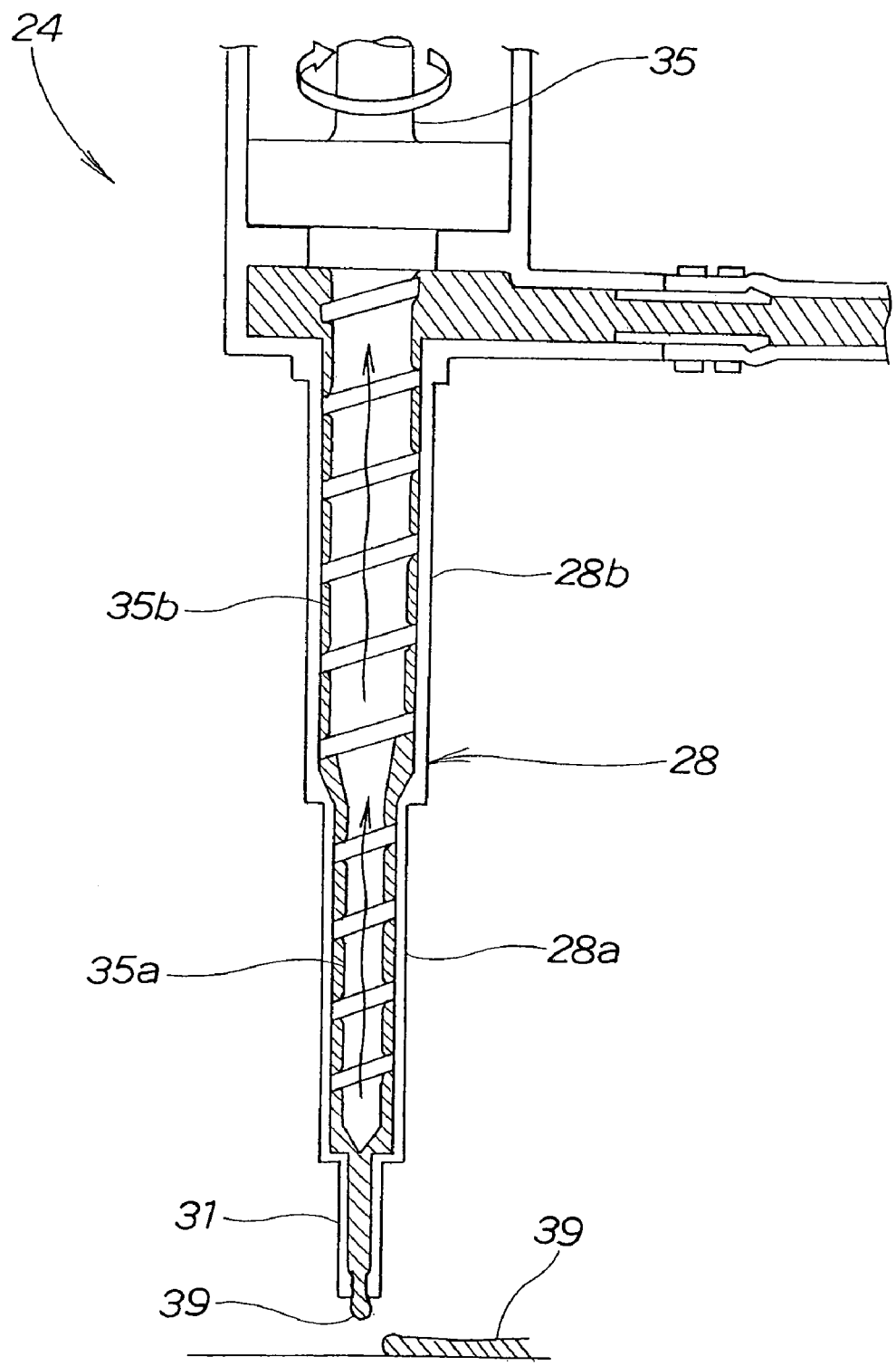
FIG. 6 is an operational view showing sucking of the sealant by the sealant coating gun according to the present invention.

As shown in FIG. 6, the electric motor is rotated in a direction opposite to the rotating direction shown in FIG. 5, and the sealant extruding shaft 35 is rotated in the direction of the outlined arrow as shown in FIG. 6. Namely, the rotating directions of the electric motor and the sealant extruding shaft 35 are inverse directions (are inverse rotations).

In accordance therewith, the sealant 39 between the first cylinder portion 28a and the groove of the first screw 35a and the sealant 39 between the second cylinder portion 28b and the groove of the second screw 35b are moved upward, and the sealant 39 in the nozzle portion 31 is sucked.

Accordingly, a discharged amount of the sealant 39 from the nozzle portion 31 is reduced, and the discharging of the sealant 39 from the nozzle portion 31 will stop in a short time.

Figure 7:
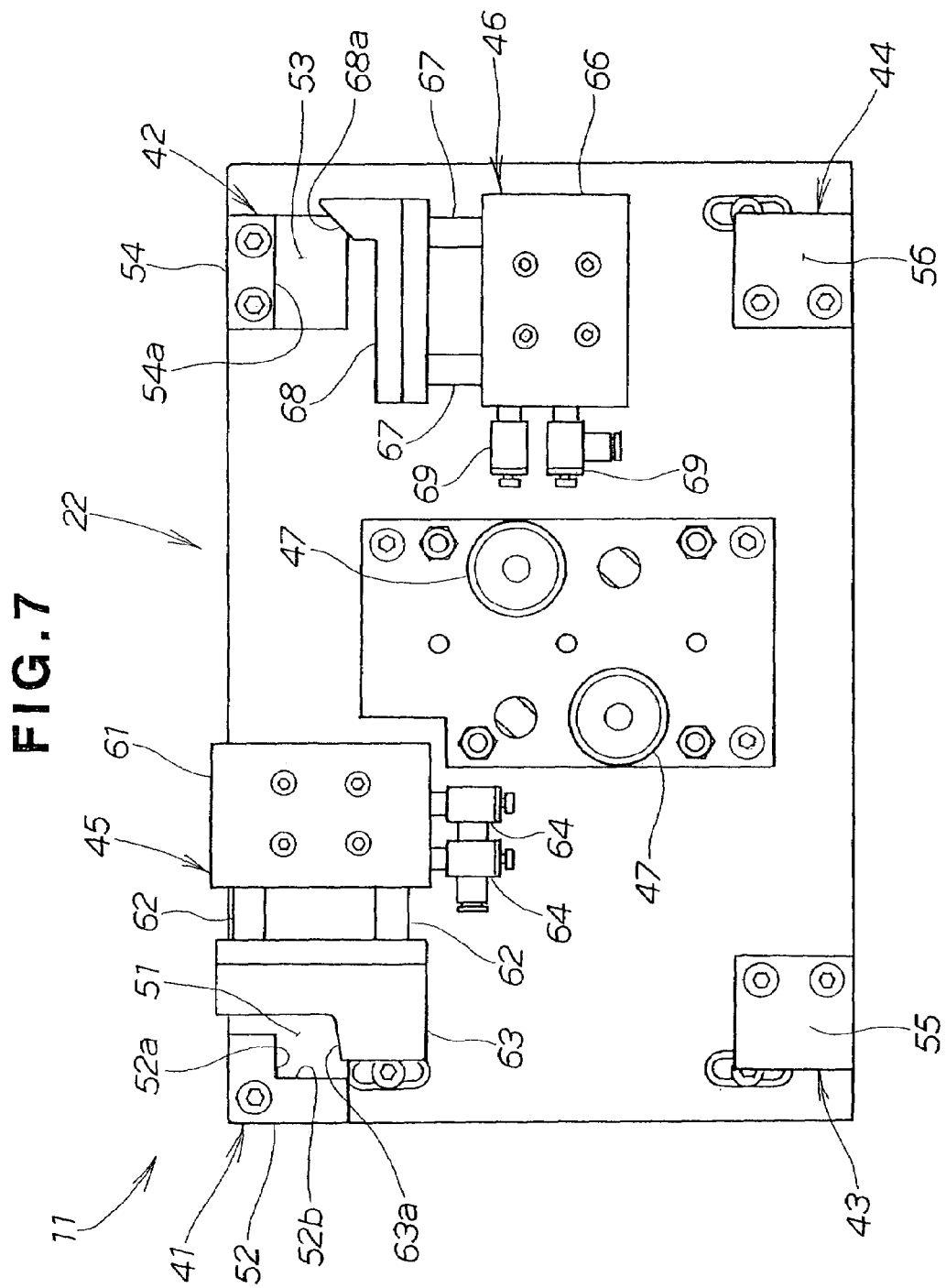
FIG. 7 is a top view of a separator placement platform as seen from arrow 7 of FIG. 2.

As shown in FIG. 7, the separator placement platform 22 of the sealant coating station 11 has pallet placement platforms 41, 42, 43, 44 on which pallets (to be described later) which convey the separator are placed, a first positioning member 45 and a second positioning member 46 which are for positioning the pallets on the separator placement platform 22, and straightening devices 47, 47 for straightening warping of the separator placed on the pallet.

The pallet placement portion 41 has a placement surface 51 and an L-shaped convex portion 52 which is made to project from the placement surface 51, and the L-shaped convex portion 52 is a member at which positioning surfaces 52a, 52b are formed.

The pallet placement portion 42 has a placement surface 53 and a rectangular convex portion 54 which is made to project from the placement surface 53, and the rectangular convex portion 54 is a member at which a positioning surface 54a is formed.

The pallet placement portions 43, 44 have placement surfaces 55, 56.

The first positioning member 45 is formed from a cylinder portion 61, rods 62, 62 inserted in unillustrated cylinders in the cylinder portion 61, and a pressing portion 63 attached to the distal ends of these rods 62, 62. The first positioning member 45 pushes the rods 62, 62 out by supplying oil or air from intake openings 64, 64 into the cylinders, and presses a portion of the above-described pallet by the pressing portion 63, and positions the pallet. Note that reference numeral 63a is an inclined surface provided at the pressing portion 63.

The second positioning member 46 is formed from a cylinder portion 66, rods 67, 67 inserted in unillustrated cylinders in the cylinder portion 61, and a pressing portion 68 attached to the distal ends of these rods 67, 67. The second positioning member 46 pushes the rods 67, 67 out by supplying oil or air from intake openings 69, 69 into the cylinders, and presses a portion of the above-described pallet by the pressing portion 68, and positions the pallet. Note that reference numeral 68a is an inclined surface provided at the pressing portion 68.

Figure 8A:
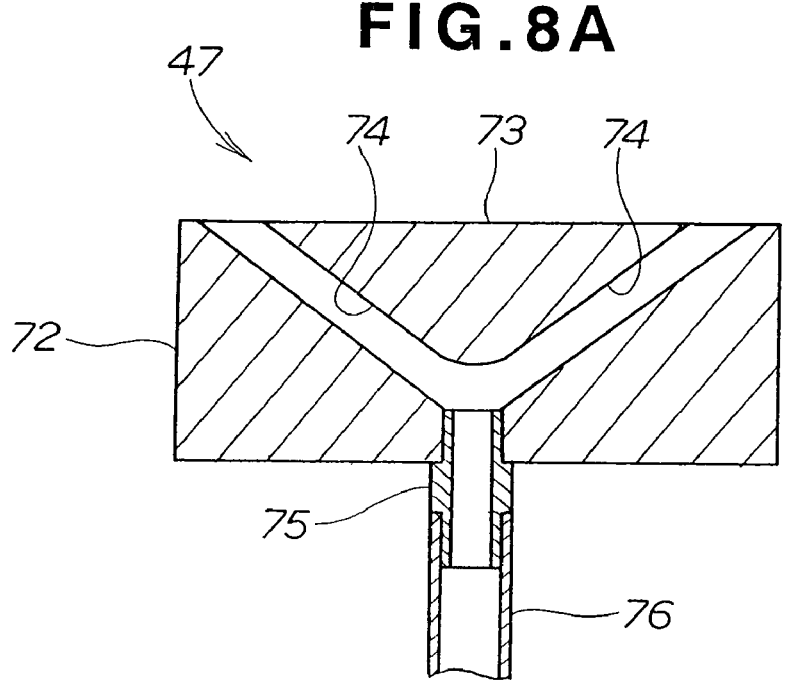
FIGS. 8A and 8B are explanatory drawings of a straightening device of the separator for fuel cell according to the present invention, where

As shown in FIG. 8A, the straightening device 47 is formed from a cylinder portion 72, a joint pipe 75 connected to jet holes 74 . . . (here and hereafter, . . . denotes a plurality of) which are formed on the cylinder portion 72 and which open at the rim of the top surface 73, and an air hose 76 connected to the joint pipe 75.

Operation of the straightening device 47 which was described above will be described next.

Figure 8B:
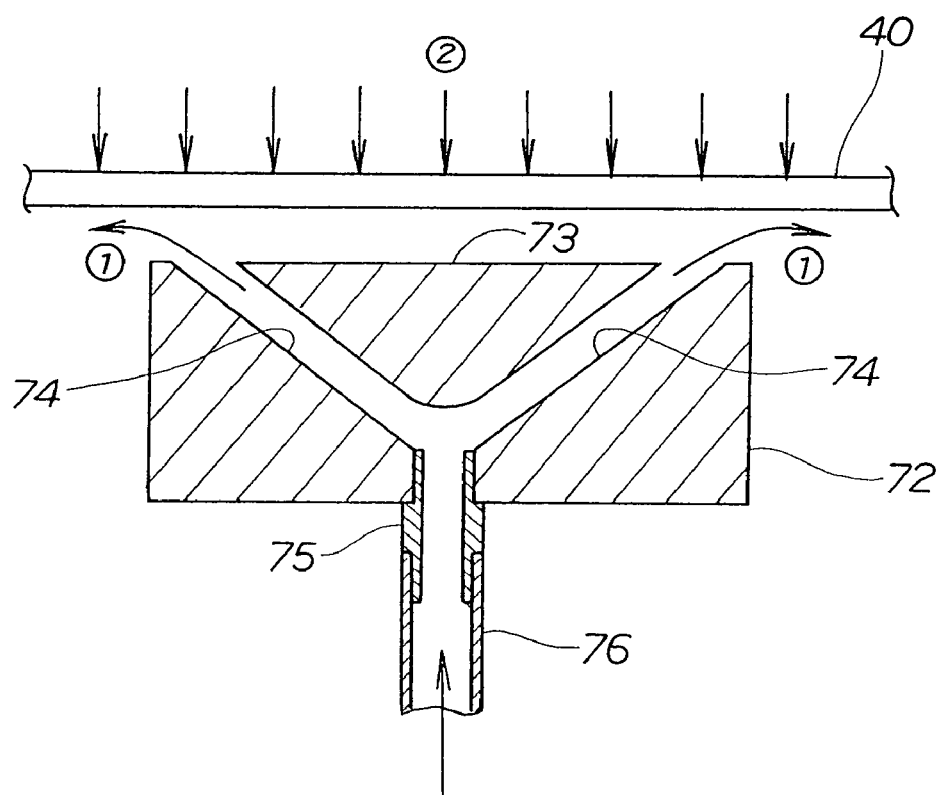

In FIG. 8B, if compressed air is supplied from the air hose 76 and is jetted to the exterior via the joint pipe 75 and the nozzles 74 . . . , when the separator 40 is made to approach the straightening device 47, the air powerfully flows out from between the rim of the pillar portion 72 and the separator 40 as shown by arrows (1), (1). In accordance therewith, because negative pressure arises between the central portion of the top surface 73 of the pillar portion 72 and the separator 40, the separator 40 is sucked toward the cylindrical portion 72 side as per arrow (2). However, due to blowing out of the air from the nozzles 74 . . . , the separator 40 does not stick to the top surface 73 of the cylindrical portion 72.

Namely, the straightening apparatus 47 can suck the separator 40 in a state of being separated from the separator 40 without contacting the separator 40, and can straighten the warping of the separator 40.

Further, because the straightening apparatus 47 does not contact the separator 40, metal ions do not adhere to the separator 40.

If metal ions adhere to the separator 40, the metal ions adhere to the carbon electrode of the MEA laminated on the separator 40, and the metal ions and electrons bond, and metal precipitates on the carbon electrode. In accordance therewith, there are cases in which the precipitated metal prevents hydrogen and oxygen from reacting and reduces the performance of the fuel cell.

Figure 9:
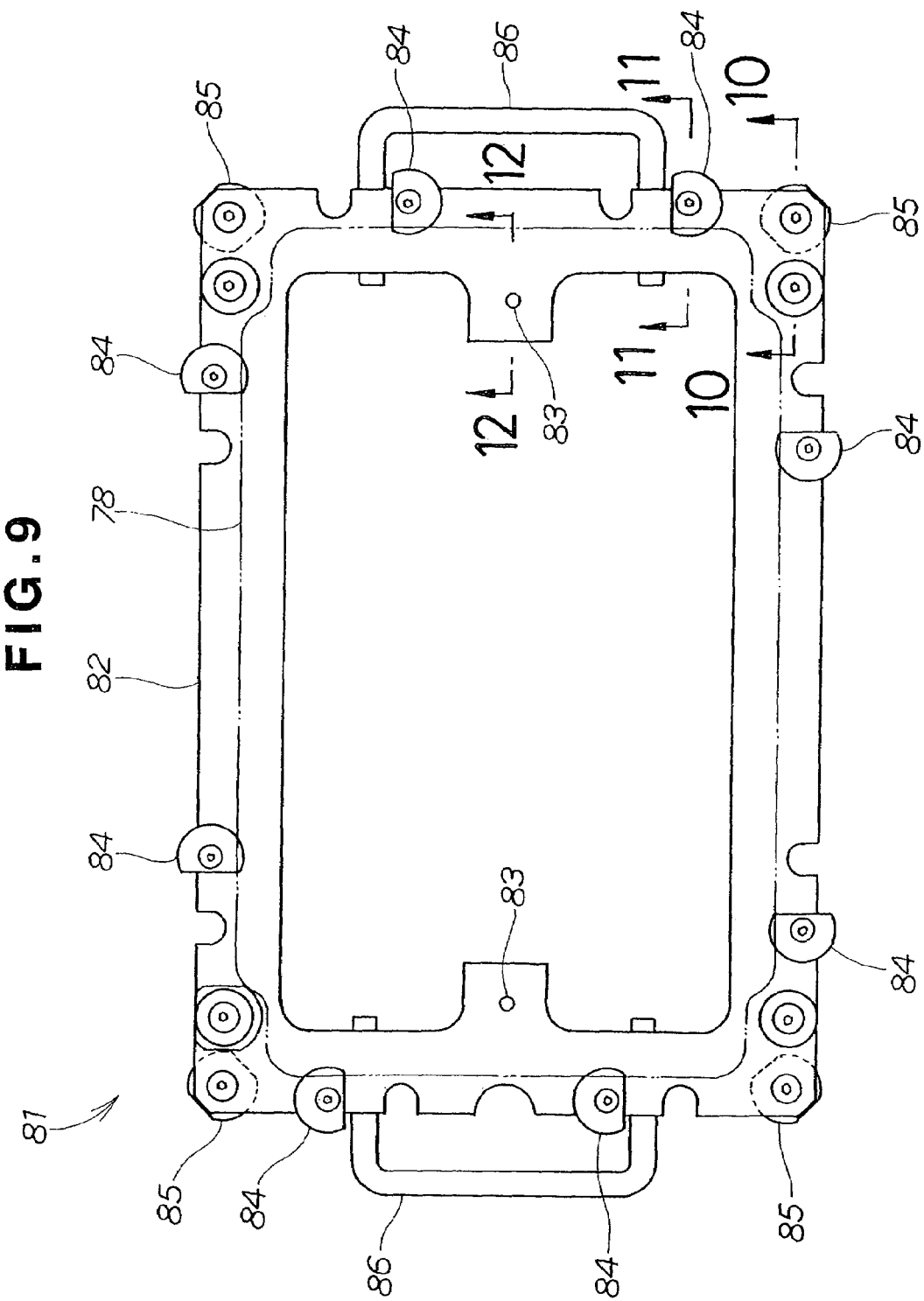
FIG. 9 is a plan view of a pallet conveying the separator for a fuel cell according to the present invention.

As shown in FIG. 9, a pallet 81 serving as a conveying member is structured such that positioning pins 83, 83 for positioning the separator 40, hooks 84 . . . for fixing the separator 40, and positioning blocks 85 . . . for positioning on the aforementioned separator placement platform 22 (refer to FIG. 7) are attached to a frame body 82. Note that, reference numerals 86, 86 are handholds.

Figure 10:
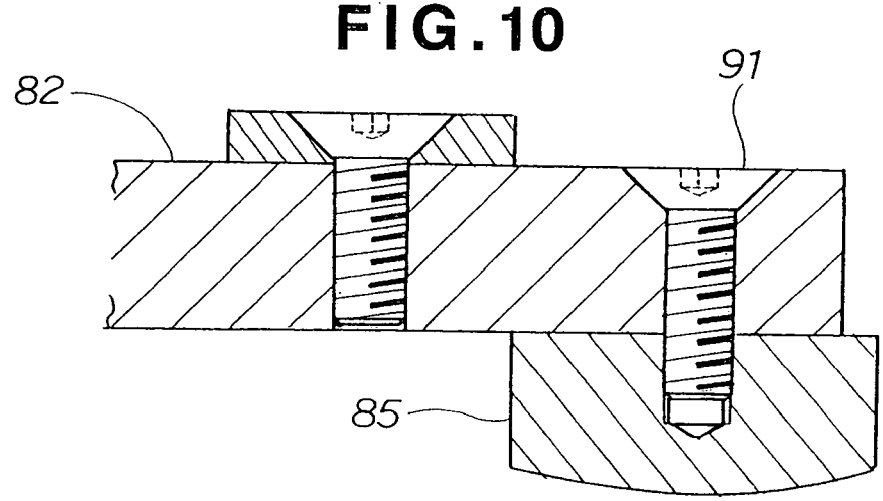
FIG. 10 is a sectional view taken along line 10—10 in FIG. 9.

FIG. 10 shows attachment of the positioning block 85 to the bottom surface of the frame body 82 by a screw 91. As shown in FIG. 9 as well, the positioning block 85 is a substantially cylindrical member.

Figure 11:
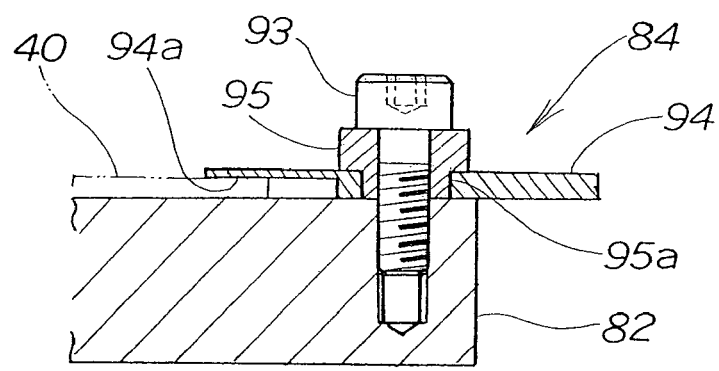
FIG. 11 is a sectional view taken along line 11—11 in FIG. 9.

As shown in FIG. 11, the hook 84 is structured such that a separator fixing piece 94 and a collar 95 are attached on the top surface of the frame body 82 by a bolt 93.

When the collar 95 is fixed to the frame body 82 by fastening the bolt 93, because the height of a step portion 95a of the collar 95 is higher than the thickness of the separator fixing piece 94, the separator fixing piece 94 can be rotated around the collar 95. Note that reference numeral 94a is a notch provided at the bottom surface portion of the separator fixing piece 94 for catching on the rim of the separator 40.

Figure 12:
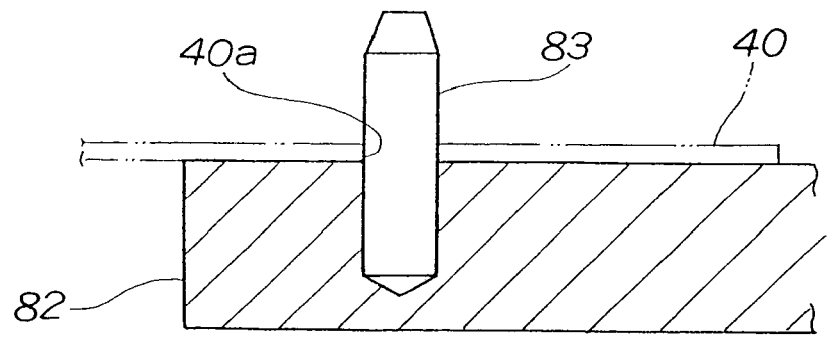
FIG. 12 is a sectional view taken along line 12—12 in FIG. 9.

FIG. 12 shows a state in which the positioning pin 83 is driven into the top surface of the frame body 82 and the positioning hole 40a of the separator 40 is fitted into the positioning pin 83.

Operation of the seal coat laminating apparatus 10 of a separator for a fuel cell which was described above will be described next.

Figure 13:
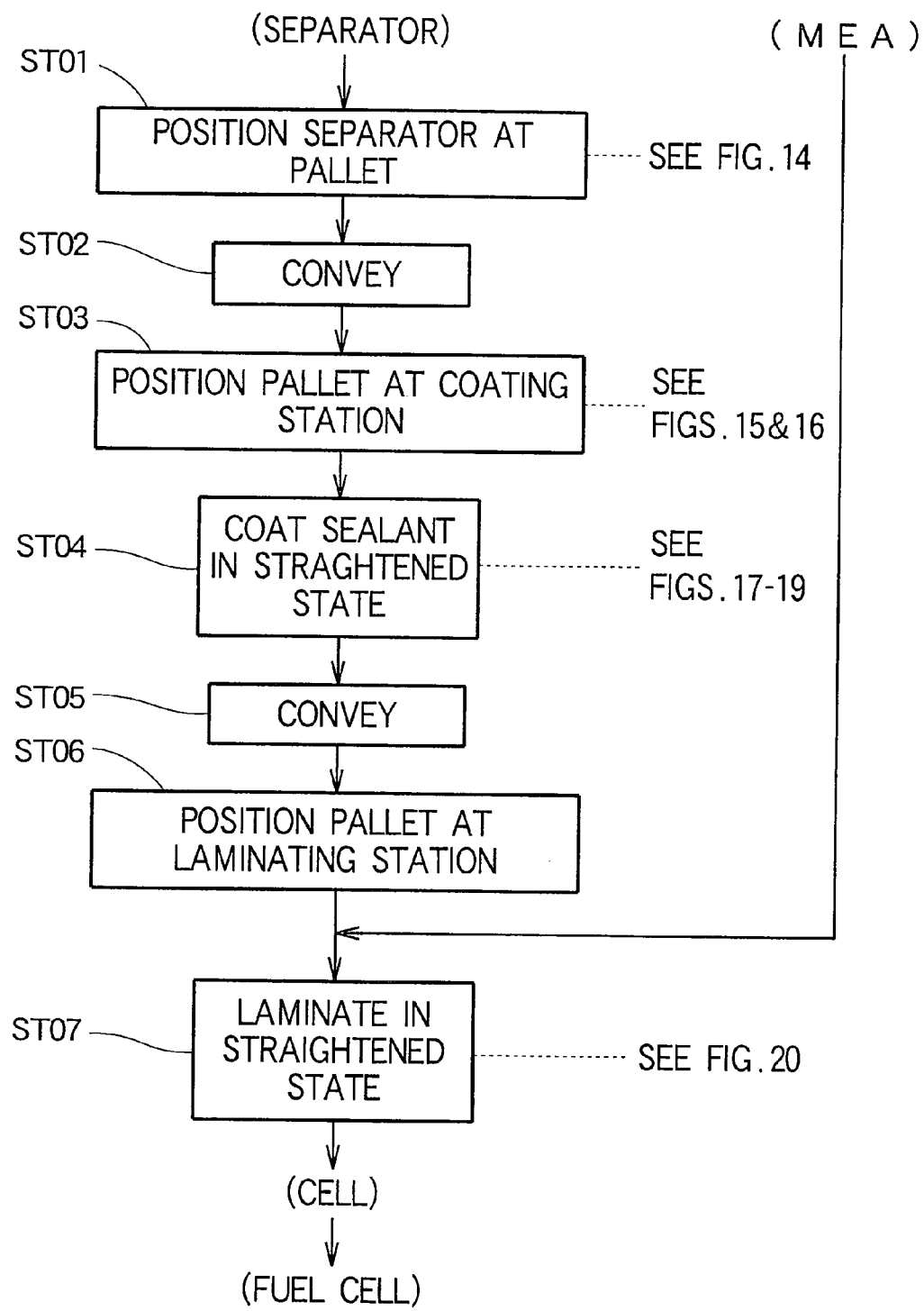
FIG. 13 is a flowchart of coating and laminating of the sealant of the separator for a fuel cell according to the present invention.

FIG. 13 shows a flowchart of sealant coating and laminating of the separator for a fuel cell relating to the present invention. Note that STxx denotes the step number.

ST01 . . . The separator is positioned on the pallet.
ST02 . . . The separator is conveyed by the pallet.
ST03 . . . The pallet is positioned at the sealant coating station. In this way, the separator is positioned at the sealant coating station.
ST04 . . . The sealant is coated on the separator in a state in which warping of the separator is straightened.
ST05 . . . The separator is conveyed by the pallet.
ST06 . . . The pallet is positioned at the laminating station.
ST07 . . . The MEA is laminated on the separator in a state in which warping of the separator is straightened. In this way, the cell is made, and the fuel cell is made by laminating a plurality of cells.

As shown in FIG. 14A, first, the positioning holes 40a, 40a of the separator 40 are fitted into the positioning pins 83, 83 of the pallet 81, and the separator 40 is positioned at the pallet 81.

In FIG. 14B, the separator fixing piece 94 of the hook 84 which is provided at the pallet 81 is rotated as shown by the arrow, and the rim of the separator 40 is fixed by hooking the notch 94a of the separator fixing piece 94 on the separator 40 as shown in FIG. 14c.

Figure 15:
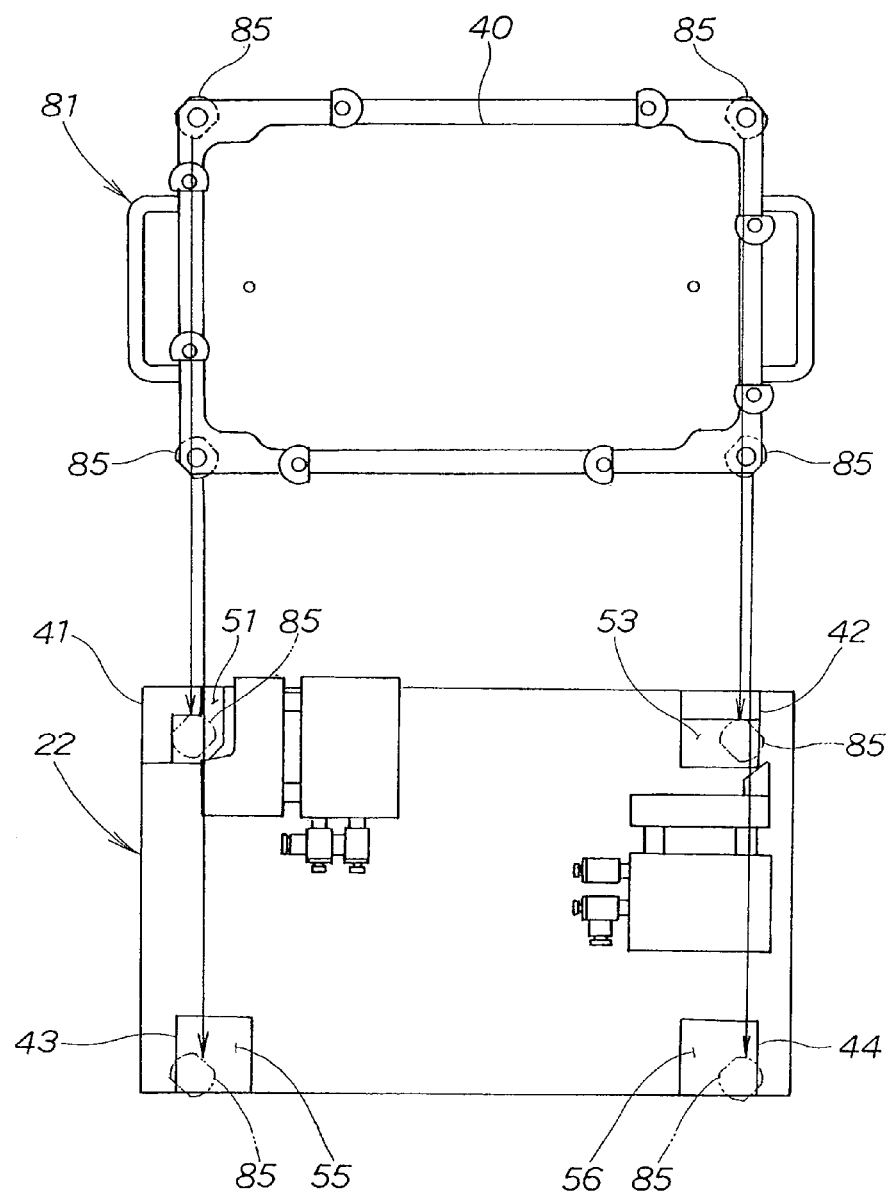
FIG. 15 is an operational view showing placement of the pallet for the separator according to the present invention onto a separator placement platform.

As shown in FIG. 15, the respective positioning blocks 85 are placed on the pallet placement portions 41, 42, 43, 44 of the separator placement platform 22.

In FIG. 16A, the positioning block 85 is in a state of being placed on the placement surface 51 so as to be separated from the positioning surfaces 52a, 52b of the L-shaped convex portion 52.

In FIG. 16B, the positioning block 85 is in a state of being placed on the placement surface 53 so as to be separated from the positioning surface 54a of the rectangular convex portion 54.

In FIG. 16C, by supplying oil or air to the cylinder portion 61, while moving the pressing portion 63 toward the L-shaped convex portion 52 side via the rods 62, 62 as shown by the outlined arrow, the inclined surface 63a of the pressing portion 63 is made to contact the positioning block 85.

In accordance therewith, the positioning block 85 moves toward the left side and the upper side as shown by the arrows, by receiving components of force in the left direction and the upward direction which are received from the inclined surface 63a in the drawing.

In FIG. 16D, by supplying oil or air to the cylinder portion 66, while moving the pressing portion 68 toward the rectangular convex portion 54 side via the rods 67, 67 as shown by the outlined arrow, the slope 63a shown in FIG. 16A is made to contact the positioning block 85. At the substantially same time, the slope 68a of the pressing portion 68 shown in FIG. 16B is made to contact the positioning block 85.

In accordance therewith, the positioning block 85 moves toward the left side and the upper side as shown by the arrows by receiving components of force in the left direction and the upward direction in the drawing which are received from the inclined surface 63a.

In FIG. 16C and FIG. 16D, if moving of the pressing portions 63, 68 is continued, the positioning block 85 of FIG. 16A contacts the positioning surfaces 52a, 52b by the inclined surfaces 63a, 68a, and the positioning block 85 of FIG. 16B contacts the positioning surface 54a.

At this time, C exists as a clearance amount between a side surface 63b of the pressing portion 63 and the positioning block 85. Namely, the positioning block 85 is supported by three points of the positioning surfaces 52a, 52b and the inclined surface 63a.

The positioning blocks 85, 85 which are respectively placed on the placement surface 55 of the pallet placement portion 43 and the placement surface 56 of the pallet placement portion 44, which are shown in FIG. 15, integrally move with the positioning blocks 85, 85 placed on the placement surfaces 51, 53 which were described above.

In this way, positioning of the pallet 81 on the separator placement platform 81 is completed.

Figure 17A:
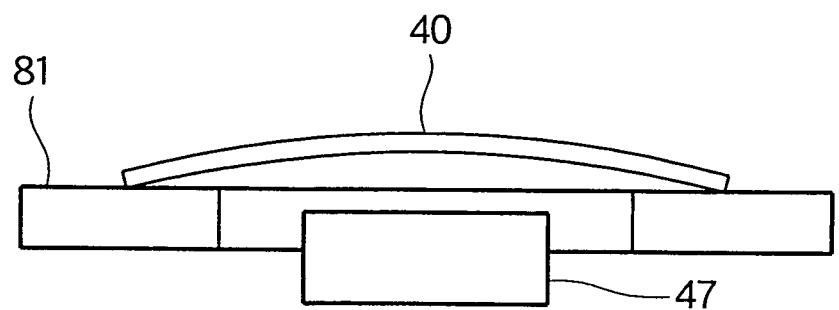
FIG. 17A and FIG. 17B are operational views showing the operation of straightening warping of the separator according to the present invention.

FIG. 17A shows a state in which the straightening device 47 is arranged below the separator 40 placed on the pallet 81. (One straightening device 47 among the two straightening devices 47 is omitted for convenience.)

In the separator 40, in a case in which a groove which is a gas flow path or the like is formed only on one side or in a case in which grooves whose shapes are different from one another are formed on one side and the other side, warping arises as shown in the drawing.

Figure 17B:
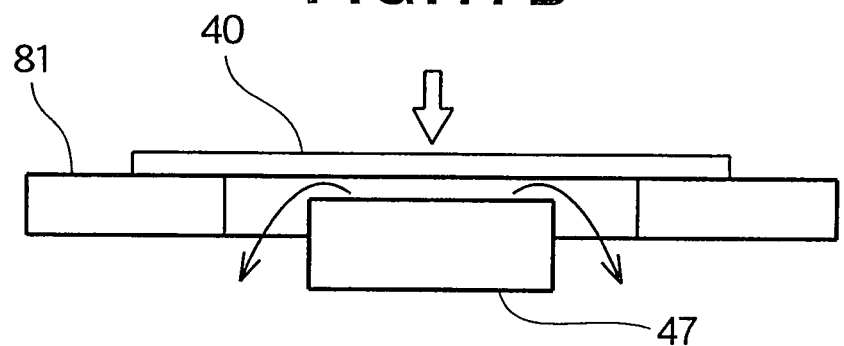

In FIG. 17B, in order to straighten the warping of the separator 40, compressed air is supplied to the straightening device 47, and the air is jetted from between the straightening device 47 and the separator 40 to the exterior as shown by the arrows, and the straightening device 47 sucks the separator 40. As a result, the separator 40 is made to be flat as shown by the outlined arrow.

Figure 18:
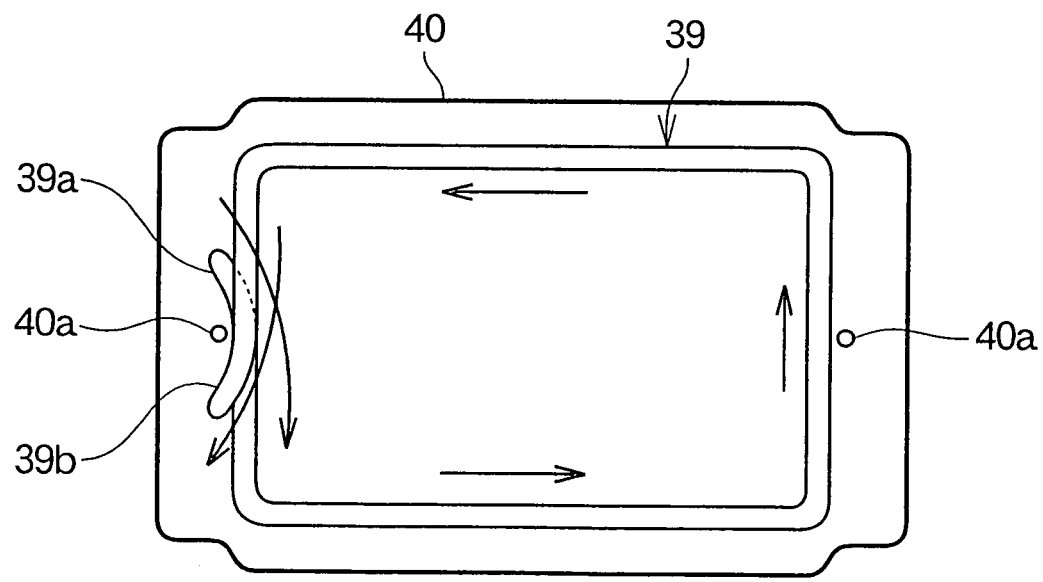
FIG. 18 is an operational view in which the sealant is coated while straightening warping of the separator according to the present invention.

As shown in FIG. 18, in a state in which the warping of the separator 40 is being straightened, namely, while the straightening device 47 (refer to FIG. 17B) is being made to work, the sealant 39 is coated on the separator 40.

For example, it starts to coat the sealant 39 from a vicinity of the positioning hole 40a (reference numeral 39a is a coating-start portion), and coats the sealant 39 in a rectangular shape as shown by the arrows at the inner side along the rim of the separator 40 and so as to make a coating-end portion 39b intersect the coating-start portion 39a and overlap them.

Figure 19A:
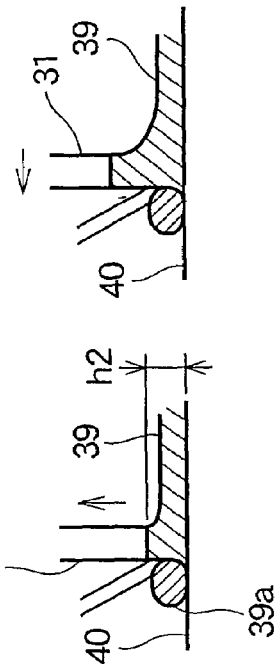
FIG. 19A through FIG. 19H are operational views showing procedures of coating the sealant (in particular, at the vicinity of an intersection position of the sealant) on the separator according to the present invention, where

In FIG. 19A, the nozzle portion 31 of the sealant coating gun moves while coating the sealant 39 on the separator 40, while maintaining a height h1 from the separator 40 (namely, it is a predetermined clearance between the separator 40 and the nozzle portion 31 of the sealant coating gun).

Figure 19B:
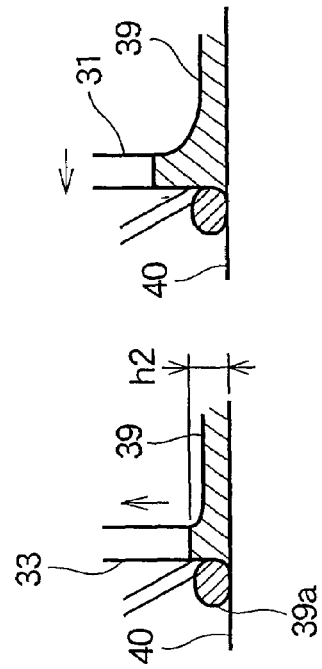
Figure 19C:
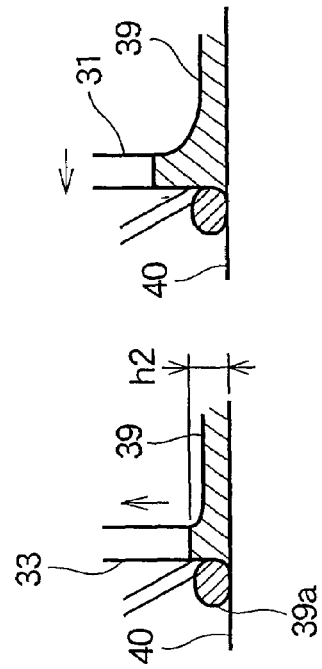

In FIG. 19B, when the nozzle portion 31 approaches the coating-start portion 39a of the sealant 39 and a laser 99 emitted from the non-contact type sensor senses the coating-start portion 39a of the sealant 39, the nozzle portion 31 starts to descend as shown by the arrow. In FIG. 19C, when the nozzle portion 31 descends up to a position of a height h2 from the separator 40, the nozzle portion 31 starts to ascends as shown by the arrow.

Figure 19D:
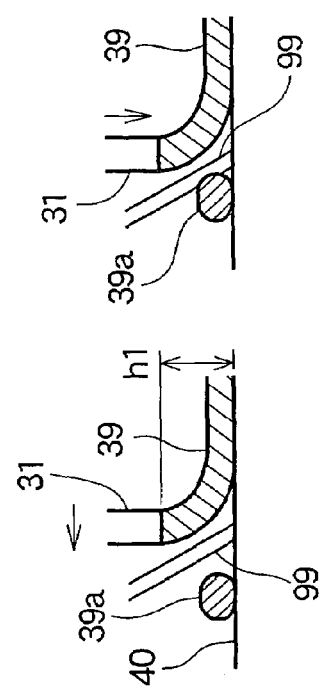

In FIG. 19D, when the nozzle portion 31 reaches the original height h1 (refer to FIG. 19A) from the separator 40, the nozzle portion 31 horizontally moves while again maintaining the height h1.

Figure 19E:
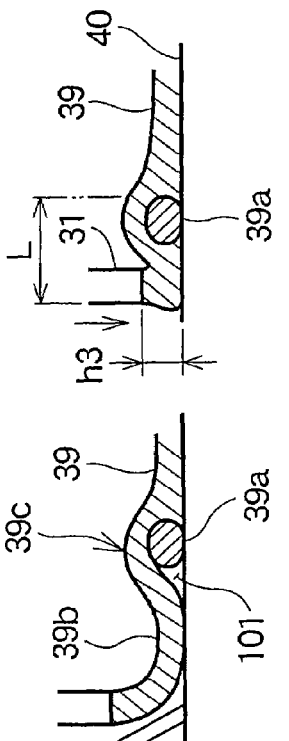
Figure 19F:
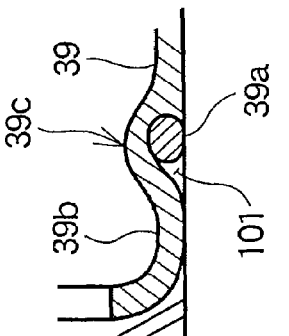
Figure 19G:
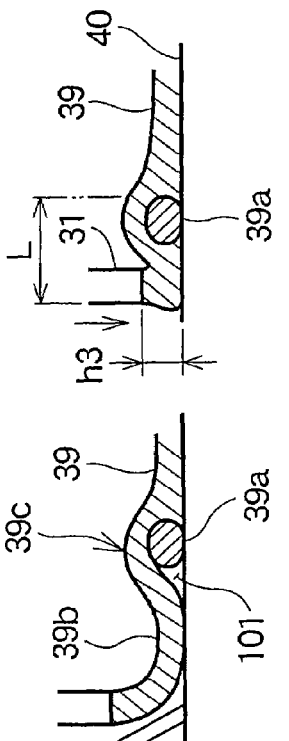

Further, as per the arrows shown in FIG. 19E and FIG. 19F, the nozzle portion 31 continues to coat the sealant 39 while horizontally moving, and ends the coating of the sealant 39 in FIG. 19G.

A space 101 exists at the left side (the side behind the intersection) of the coating-start portion 39a at an intersection portion 39c between the coating-start portion 39a and the coating-end portion 39b shown in FIG. 19G. However, there is no space at a portion at the right side (the side in front of the intersection) of the coating-start portion 39a, and the sealability can be improved.

Figure 19H:
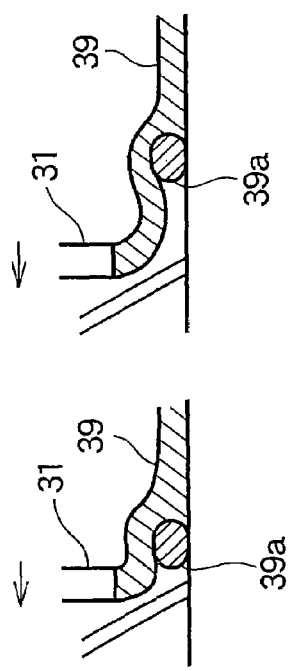

When the space 101 at the left side of the coating-start portion 39a is filled up, as in FIG. 19H, when the sealant coated position moves only by a predetermined distance L in the horizontal direction from a position which exceeds the coating-start portion 39a, for example, from the position of the nozzle portion 31 which ascends in FIG. 19B and FIG. 19C, it suffices that the nozzle portion 31 is made to descend up to a position of a height h3 (the height h3 may be equal to the height h2) from the separator 40.

Thereafter, sucking of the separator 40 by the straightening device 47 shown in FIG. 17B is stopped, and the separator 40 on which the sealant 39 is coated is conveyed by the pallet 81 (refer to FIG. 9) to the laminating station.

Because the laminating station has the separator placement platform which is the same as the separator placement platform 22 shown in FIG. 7, in the same way as described in FIG. 15 and FIG. 16A through FIG. 16D, the pallet 81 is positioned on the separator placement platform of the laminating station.

Figure 20A:
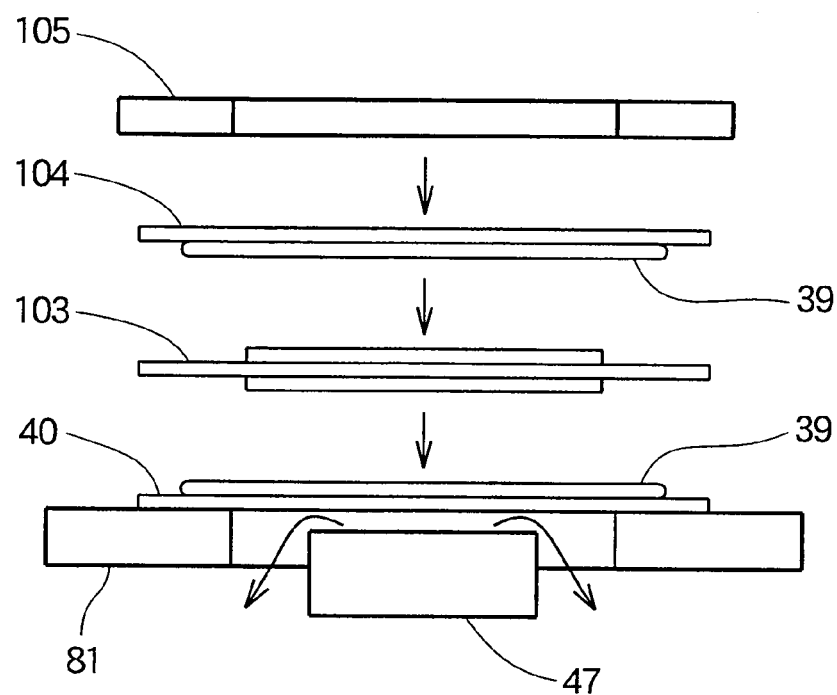
FIG. 20A and FIG. 20B are operational views showing the operation of laminating of the separator according to the present invention, where

In FIG. 20A, compressed air is supplied to the straightening device 47 provided at the laminating station, and the air is jetted from between the straightening device 47 and the separator 40 whose warping has returned as shown by the arrows, and the straightening device 47 sucks the separator 40. As a result, the separator 40 is made to be flat.

In a state in which the separator 40 is maintained flat by the separator 40 continuing to be sucked, an MEA 103 is placed on the surface of the separator 40 on which the sealant 39 is coated, and further, another separator 104 on which the sealant 39 was coated in advance is placed on the MEA 103, and a frame member 105 is further placed on the separator 104.

Figure 20B:
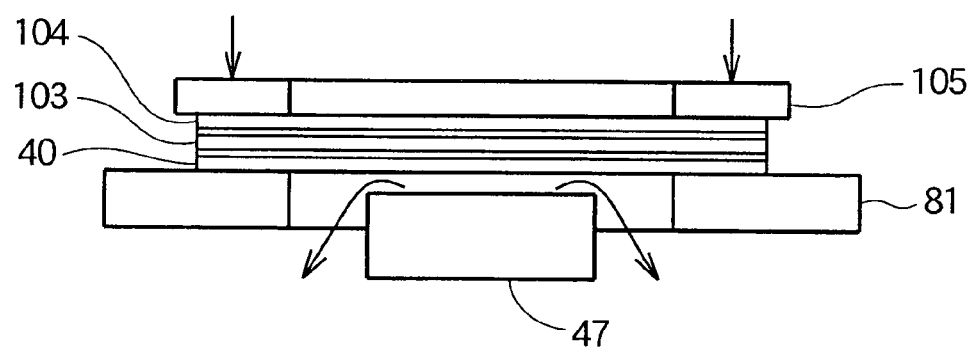

In FIG. 20B, a cell is completed by pressing the overlapped separator 40, the MEA 103, and the separator 104, as shown by the arrows, by a press device 107 shown in FIG. 1 via the frame member 105.

FIG. 21 shows a state in which an unillustrated gas flow path and water flow path are formed at the separator 40, and a sealant coating groove 118 is provided at the periphery of these gas flow path and water flow path, and the sealant 39 is coated in the sealant coating groove 118.

The sealant coating groove 118 is a circular groove in plan view which has an extension portion 122 whose width is greater than other portions. Given that the groove width of the extension portion 122 is w1 and the groove width of the portions other than the extension portion 122 is w2, w1>w2.

The sealant 39 is coated as the straight shaped coating-start portion 39a at the extension portion 122 of the seal groove 118, and is coated in order from the coating-start portion 39a, as a first curved portion 124, a first straight portion 125, a second curved portion 126, a second straight portion 127, and a third curved portion 128, and is coated as the straight shaped coating-end portion 39b following the third curved portion 128 at the extension portion 122.

Here, reference numeral 132 denotes a movement route along which the sealant coating gun 24 horizontally moves without coating the sealant 39, and reference numerals 140 through 148 denote imaginary points provided on the sealant coating groove 118 in FIG. 21 for being a starting point or an ending point of movement of the sealant coating gun 24 when the respective portions of the sealant 39 are coated. Reference numeral 151 denotes a point on the first curved portion 124, and reference numeral 152 denotes a point of the first straight portion 125, and reference numeral 153 denotes a point on the second curved portion 126, and reference numeral 154 denotes a point on the second straight portion 127, and reference numeral 155 denotes a point on the third curved portion 128. The points 151, 153, 155 which were described above are teaching points which teach the moving direction in advance.

In FIG. 22A, the distal end of the nozzle portion 31 is disposed so as to be separated by a predetermined distance d1 from the separator 40.

In FIG. 22B, the nozzle portion 31 is made to descend by a predetermined distance d2 from the position of FIG. 22A, and coating of the sealant is started.

In FIG. 22C, after a predetermined time t1 has passed from the start of coating of the sealant 39, for a predetermined time t2, the coating is once stopped, and the sealant 39 is sufficiently adhered to the separator 40.

Further, after the aforementioned predetermined time t2, the nozzle portion 31 is made to ascend up to a position (a) at a predetermined velocity v1.

In FIG. 22D, the sealant 39 is coated on the separator 40 while horizontally moving the nozzle portion 31 at a predetermined velocity v2. At this time, the laser 99 is irradiated onto the separator 40 from the non-contact type sensor.

In FIG. 22E, when the laser 99 reaches the coating-start portion 39a of the sealant 39 and the non-contact type sensor senses the coating-start portion 39a, in FIG. 22F, because the sealant coating gun horizontally moves at a predetermined velocity v3 (v3<v2) while carrying out sealant sucking operation (refer to FIG. 6), the discharged amount of the sealant 39 from the nozzle portion 31 is reduced, and as shown by (g), discharging of the sealant 39 from the nozzle portion 31 is stopped in a short time. When the nozzle portion 31 moves up to the point 147 shown in FIG. 21, the sealant sucking operation of the sealant coating gun is completed, and the nozzle portion 31 moves from the point 147 to the point 148 at the predetermined velocity v3, and the process of coating the sealant on the separator 40 is completed.

A flowchart of another example of operation of the sealant coating gun 24 which was described above will be described next.

Figure 23:
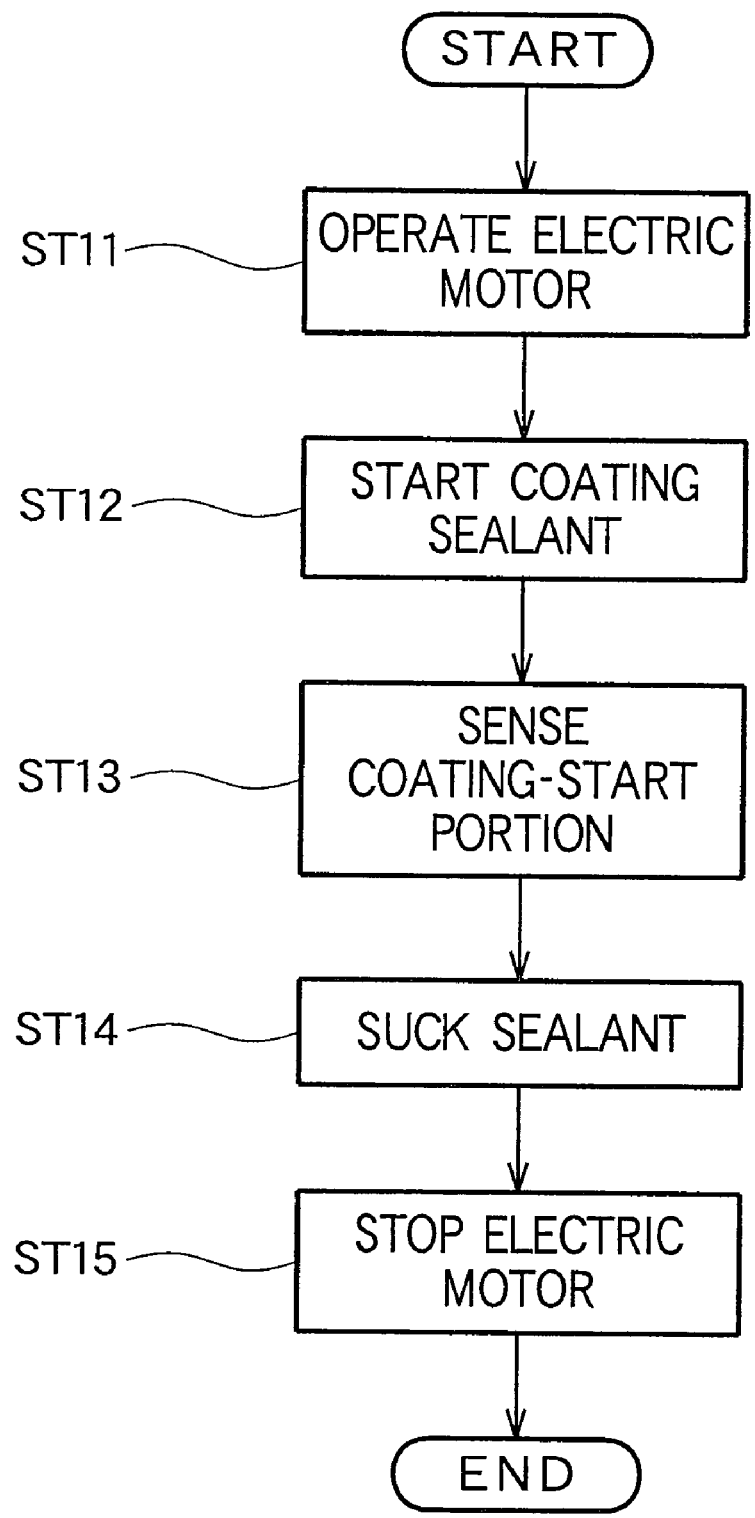
FIG. 23 is a flowchart for explanation of another example of operation of the sealant coating gun according to the present invention.
Figure 24:
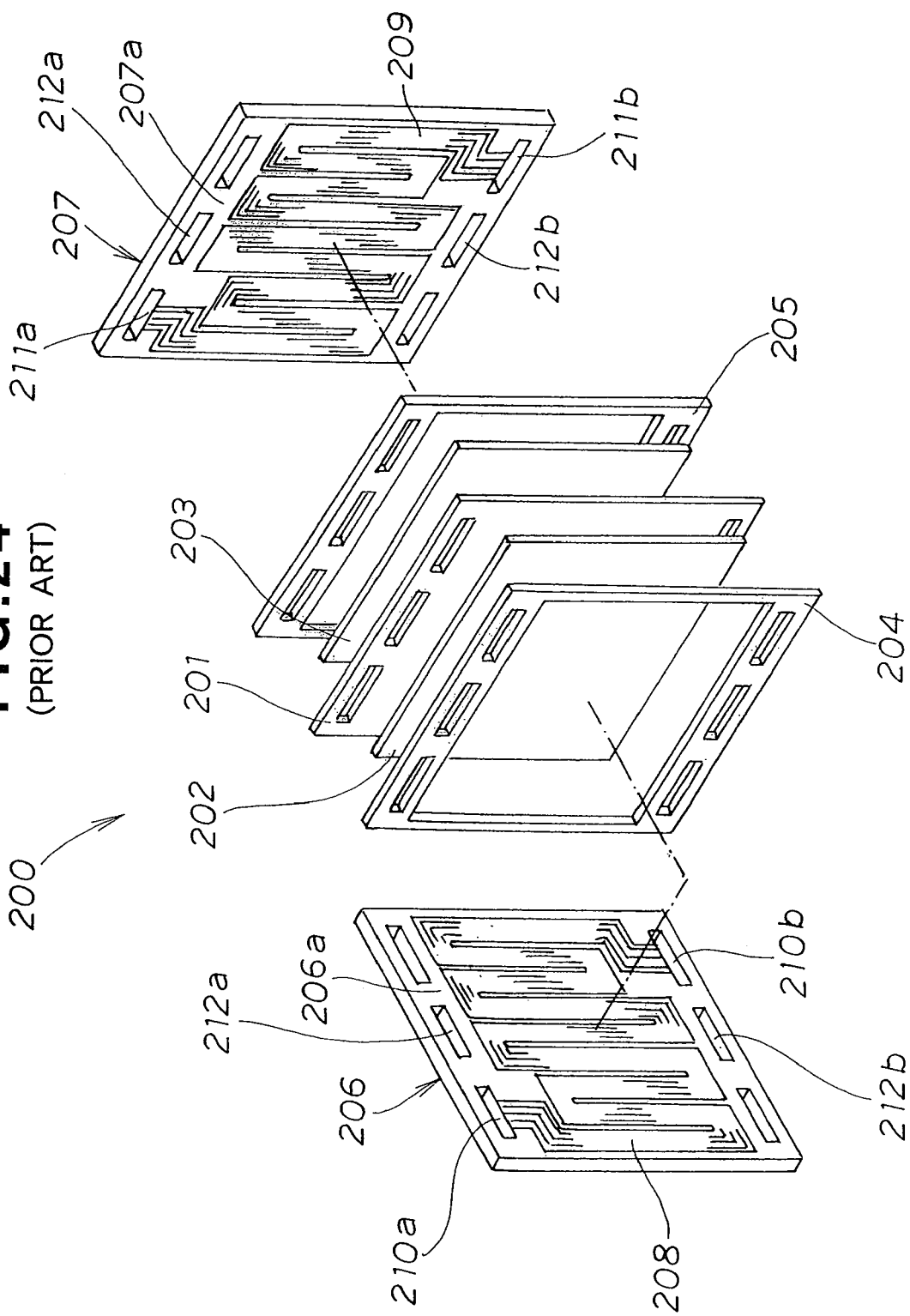
FIG. 24 is an exploded perspective view showing a conventional cell for a fuel cell.
Figure 25A:
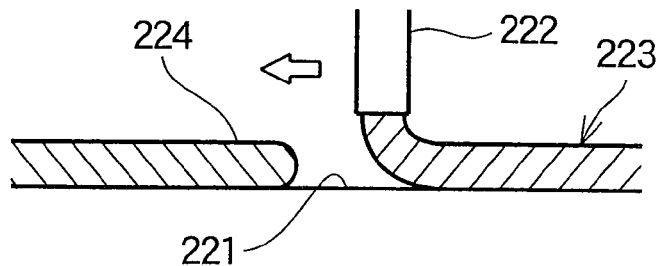
FIG. 25A through FIG. 25D are operational views for explanation of a method for coating a sealant on a conventional separator for a fuel cell, where
Figure 25B:
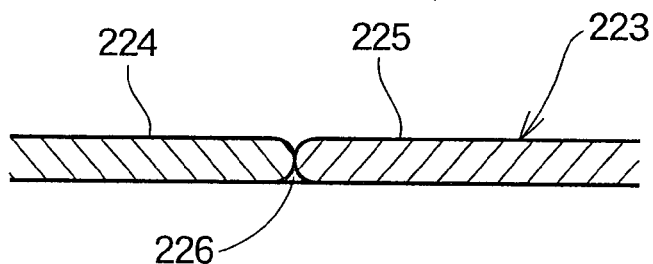
Figure 25C:
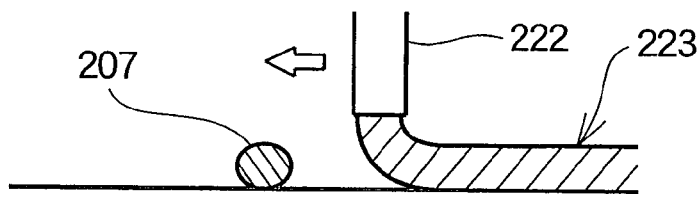
Figure 25D:
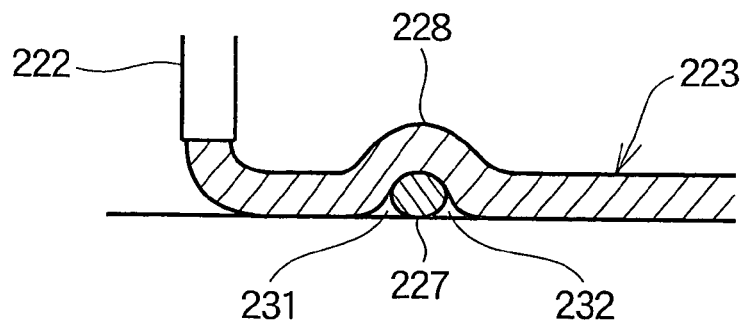
Figure 26:
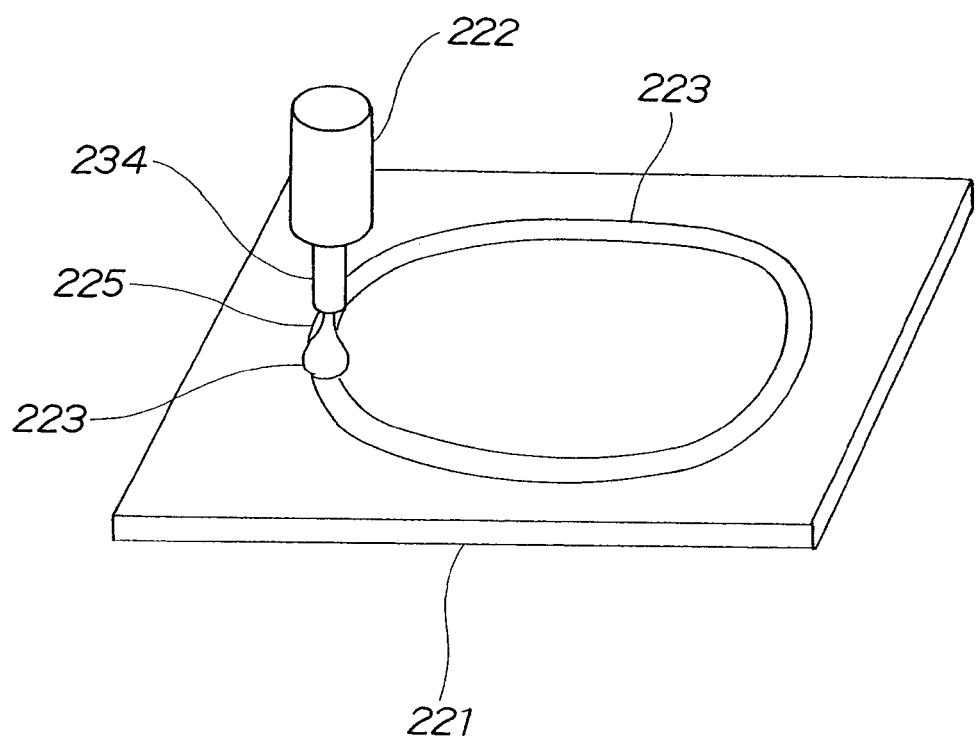
FIG. 26 is an operational view for explanation of a conventional sealant coating procedure.
Figure 27A:
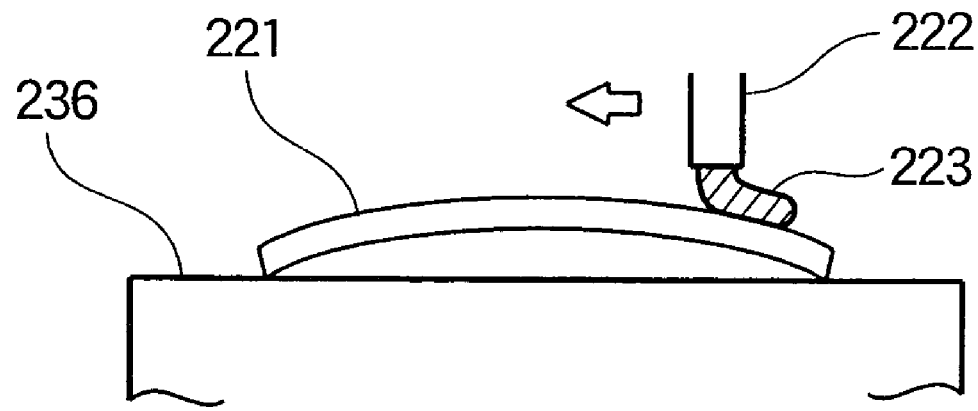
FIGS. 27A and 27B are operational views for explaining a conventional coating procedure of the sealant onto a warped separator, where
Figure 27B:
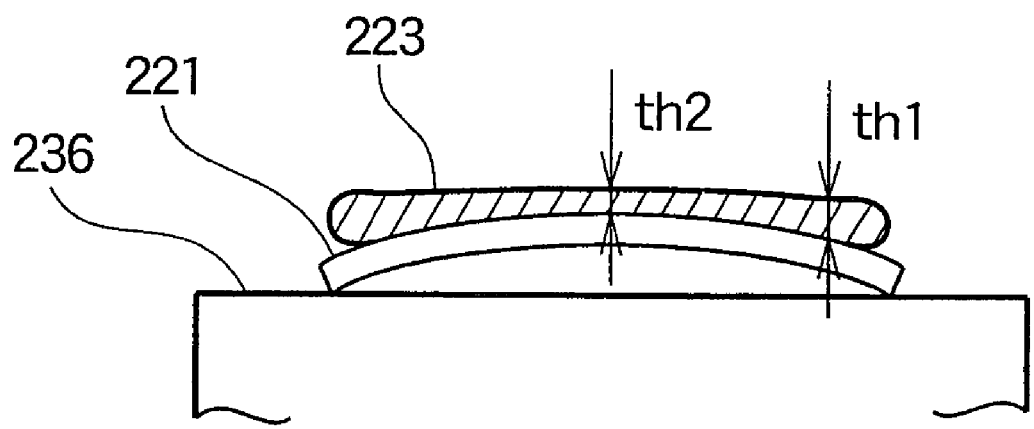

FIG. 23 explains the other example of operation of the sealant coating gun relating to the present invention. STxx denotes step numbers.

ST11 . . . The electric motor is operated.

ST12 . . . The sealant extruding shaft is rotated forward, and coating of the sealant is started.

ST13 . . . The coating-start portion is sensed by the non-contact type sensor.

ST14 . . . The sealant extruding shaft is rotated reversely, and the sealant in the nozzle portion is sucked.

ST15 . . . The electric motor is stopped.

Here, sealant coating by the sealant coating gun is completed.

INDUSTRIAL APPLICABILITY

In the present invention, a seal groove in which a sealant is coated is provided in a separator of a fuel cell, and widths of the seal groove at a coating-start portion and a coating-end portion of the sealant are made to be greater than portions other than these coating-start portion and coating-end portion, and the coating-start portion and coating-end portion of the sealant are made to intersect at a place at which the width of the seal groove is made large. In accordance therewith, adhesion between the coating-start portion and the coating-end portion can be improved, and because they are made to intersect at a place at which the seal groove is made large, the degrees of freedom of the coated position of the sealant can be increased and the sealability is improved. Accordingly, the present invention is useful for manufacturing a fuel cell.

The invention claimed is:

1. A method for coating a sealant on a separator for a fuel cell, in which a liquid sealant is coated at a periphery of a gas flow path and a water flow path of the separator by using sealant coating means which comprises a motor, sealant extruding means driven by the motor, and a nozzle portion provided at a distal end of the sealant extruding means, the method comprising the steps of:
   forming a sealing groove in the separator; and,
   coating the sealing groove with the sealant;
   wherein widths of the sealing groove at coating-start portion and coating-end portion of the sealant are made to be greater than widths of portions other than the sealant coating-start portion and the sealant coating-end portion, and the sealant coating-start portion and the sealant coating-end portion intersect at a place where the width of the sealing groove is greater.

2. The method for coating a sealant on a separator for a fuel cell according to claim 1, wherein, at the sealant coating-end portion, before an end of said coating step, a horizontal moving velocity of the nozzle portion is made to be a low velocity and a sealant coating amount is reduced.

3. The method for coating a sealant on a separator for a fuel cell according to claim 1, wherein raising and lowering of the sealant coating means is controlled so as to run along an outer periphery of the sealant at a point in time when the distal end of the sealant extruding means has approached the sealant coating-start portion.

4. The method for coating a sealant on a separator for a fuel cell according to claim 3, wherein a non-contact sensor is additionally provided at the sealant coating means, and wherein raising and lowering is started by detecting the sealant coating-start portion by the non-contact sensor.

5. The method for coating a sealant on a separator for a fuel cell according to claim 1, wherein means for straightening warping of the separator is additionally provided at a sealant coating station which coats the sealant on the separator, and the sealant is coated on the separator while warping of the separator is corrected by the straightening means.

6. The method for coating a sealant on a separator for a fuel cell according to claim 5, wherein negative pressure generated at the straightening means is controlled to maintain a clearance between the separator and the sealant coating means.

7. A method for coating a sealant on a separator for a fuel cell, in which a liquid sealant is coated at a periphery of a gas flow path and a water flow path of the separator by using sealant coating means including a sealant extruding means and a nozzle portion provided at a distal end of the sealant extruding means, the method comprising the steps of:
   forming a sealing groove on the separator, said sealing groove being generally circular and having a variable width whereby a width of the sealing groove at locations corresponding to a sealant coating-start portion and a sealant coating-end portion is greater than a width of other portions of said sealing groove;
   extruding sealant from said nozzle portion while moving one of said separator and said sealant extruding means relative to the other of said separator and sealant extruding means so as to coat sealant in said sealing groove generally continously from the sealant coating-start portion to said sealant coating-end portion;
   wherein said extruded sealant intersects at said sealant coating-start portion and said sealant coating-end portion where the width of the sealing groove greater.

8. The method for coating a sealant on a separator for a fuel cell according to claim 7, wherein the extruding step includes the step of:
   at the sealant coating-end portion, before an end of extruding, a horizontal moving velocity of the nozzle portion is relatively reduced and an amount of sealant extruded is relatively reduced.

9. The method for coating a sealant on a separator for a fuel cell according to claim 7, wherein said extruding step includes the steps of:
   sensing when the distal end of the sealant extruding means is approaching the sealant coating-start portion; and,
   controlling a vertical position of said sealant extruding means so as to run along an outer periphery of the already-extruded sealant at the coating-start portion of the sealant.

10. The method for coating a sealant on a separator for a fuel cell according to claim 9, wherein a non-contact sensor is provided by the sealant coating means, and vertical position control is initiated by detection of the sealant coating-start portion by the non-contact type sensor.

11. The method for coating a sealant on a separator for a fuel cell according to claim 7, wherein a sealant coating station, at which the sealant is coated on the separator, includes means for straightening a warp of the separator, the method including the further steps of:
   straightening a warp of the separator while the sealant is being coated on the separator.

12. The method for coating a sealant on a separator for a fuel cell according to claim 11, comprising the further step of:
   controlling a negative pressure generated at the straightening means to maintain a clearance between the separator and the sealant coating means.

* * * * *